Nov. 21, 1967  T. L. HORDOSI  3,354,389
AUTOMATIC HIGH SPEED TEST APPARATUS FOR TESTING CONTINUITY
AND SHORTS SIMULTANEOUSLY ON A PLURALITY OF CIRCUIT PATHS
Filed Oct. 24, 1963  12 Sheets-Sheet 10
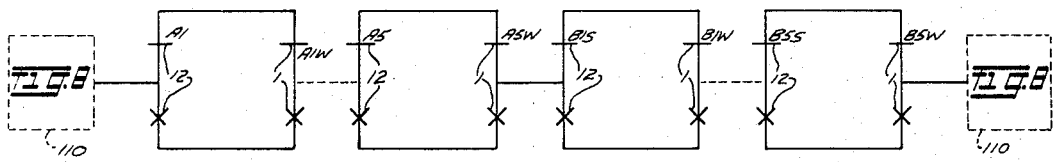
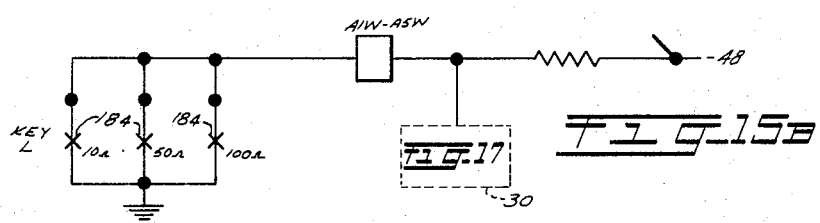
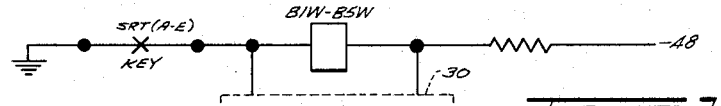
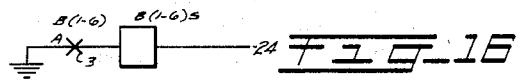
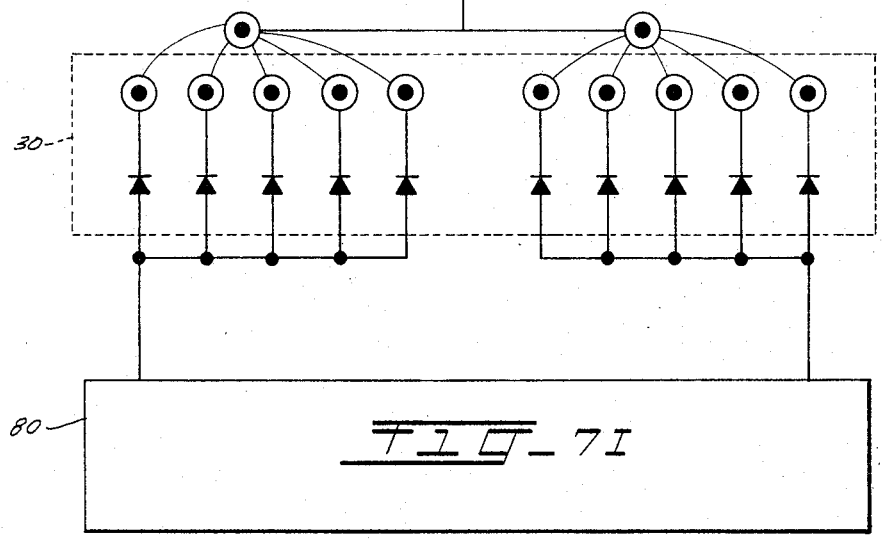

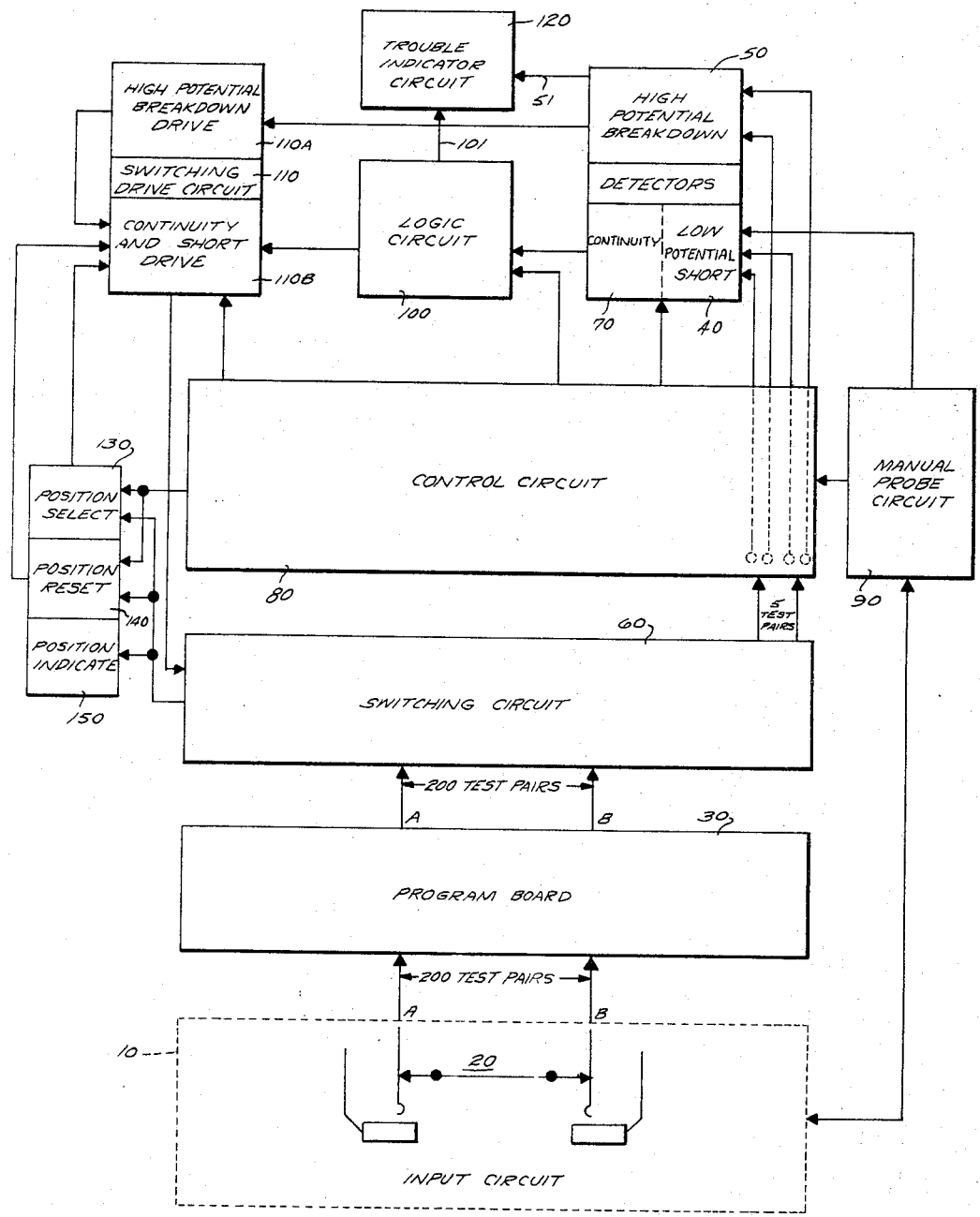

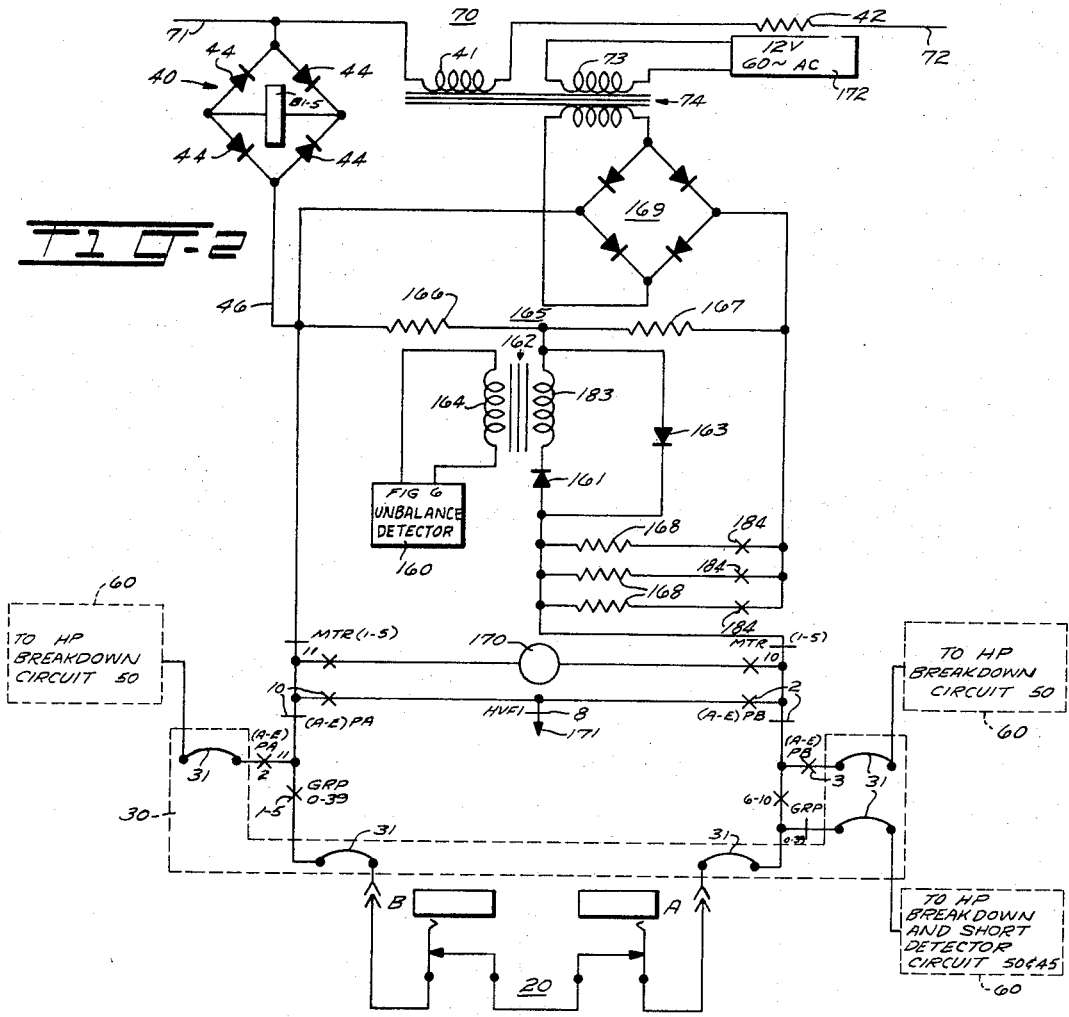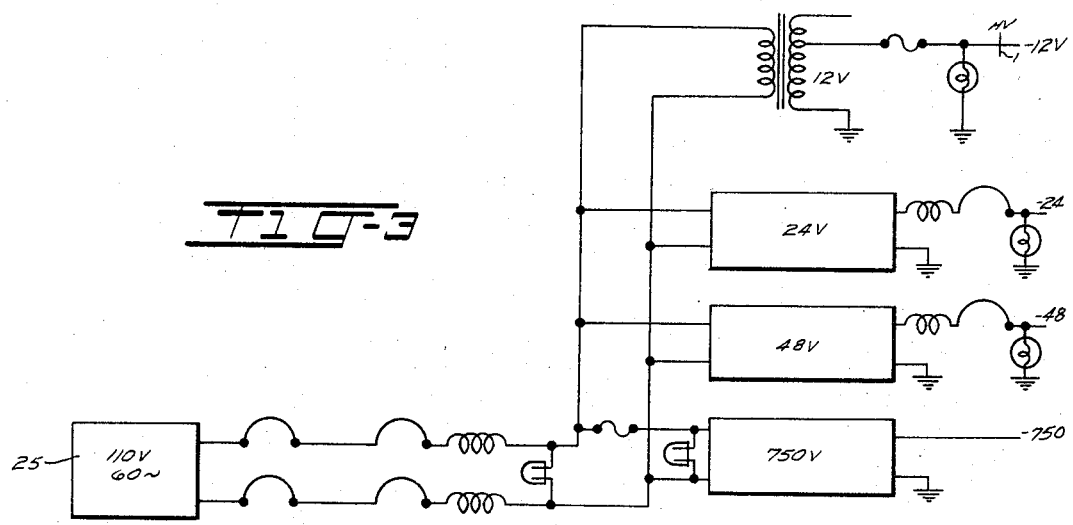

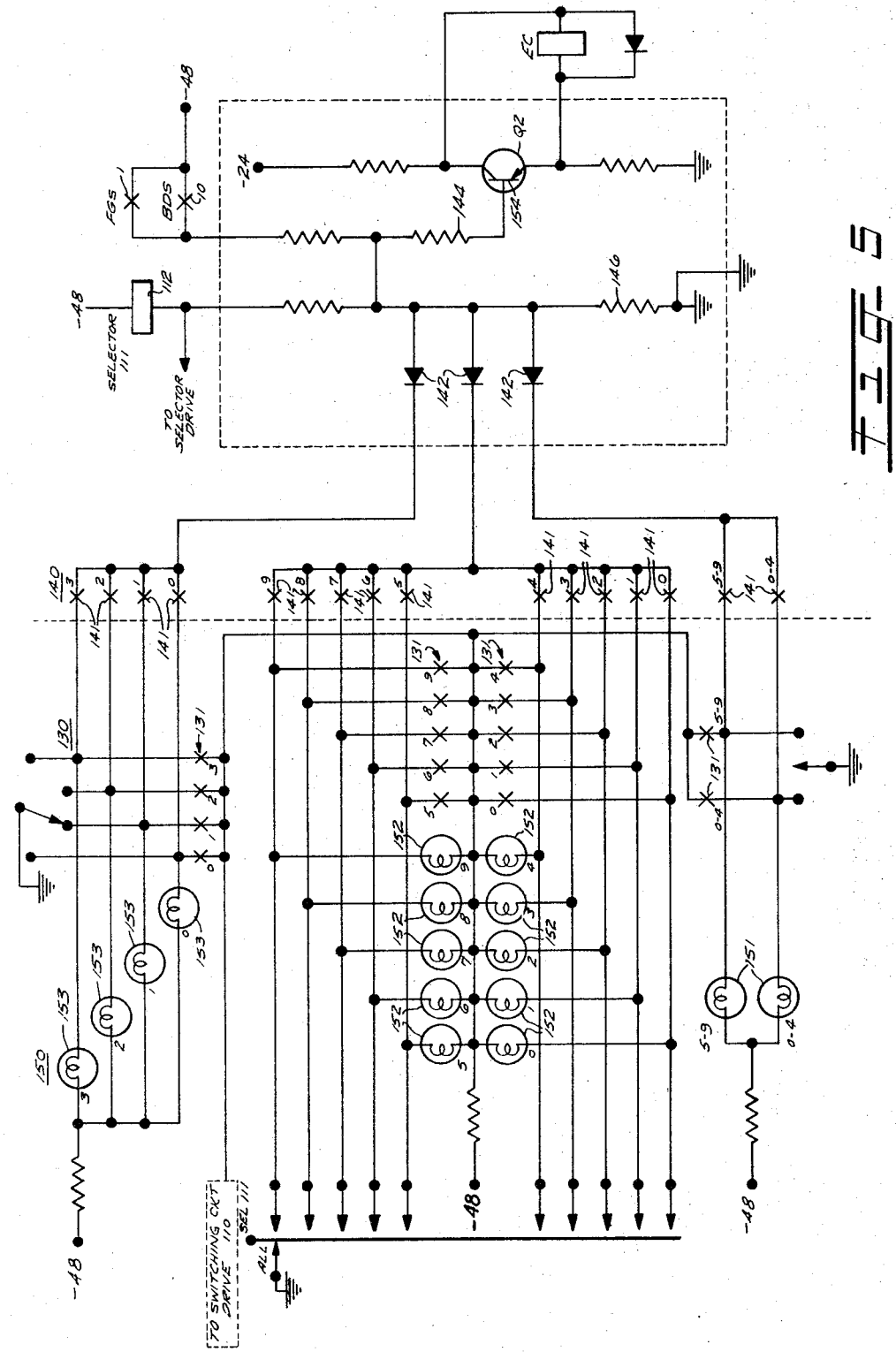

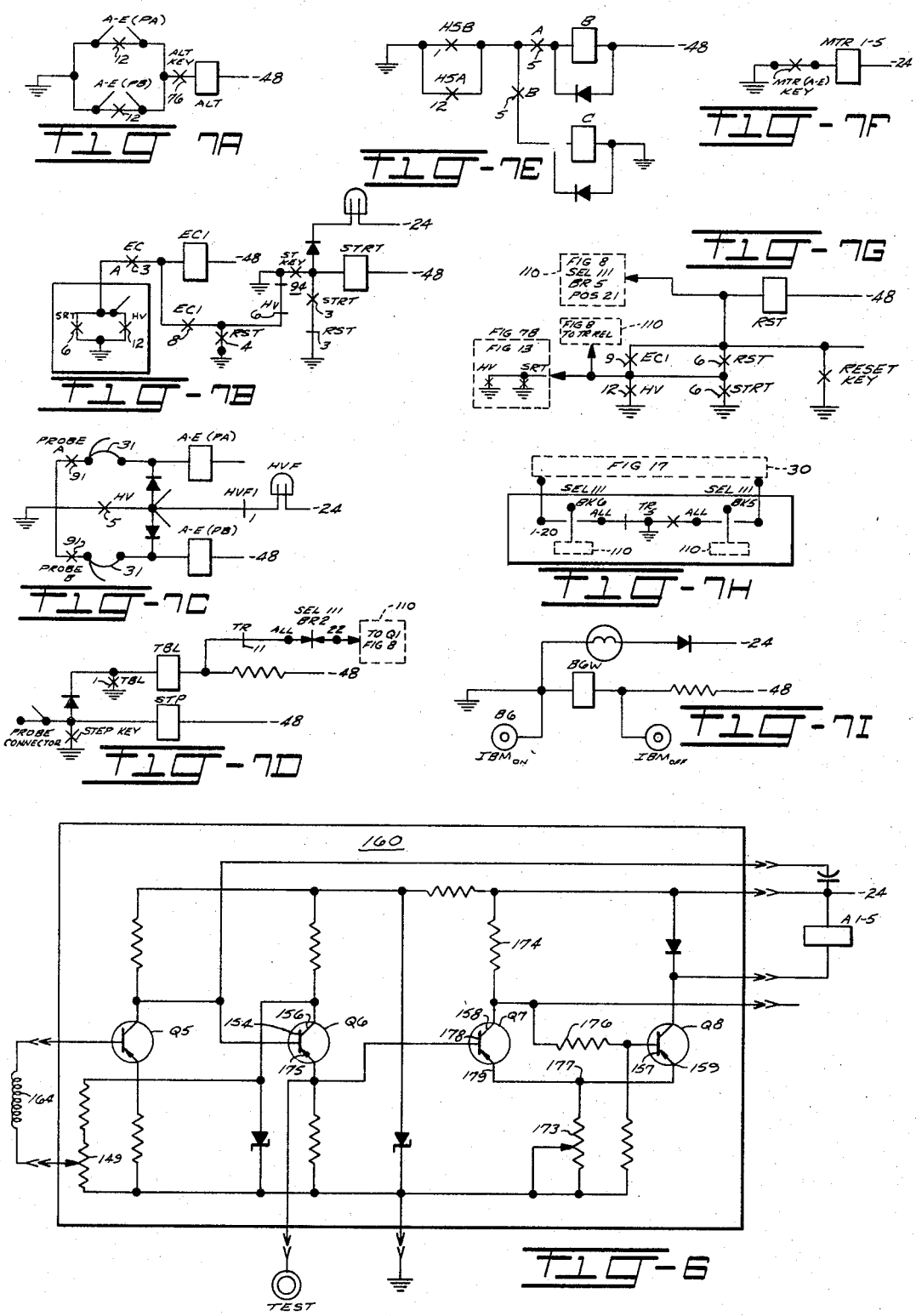

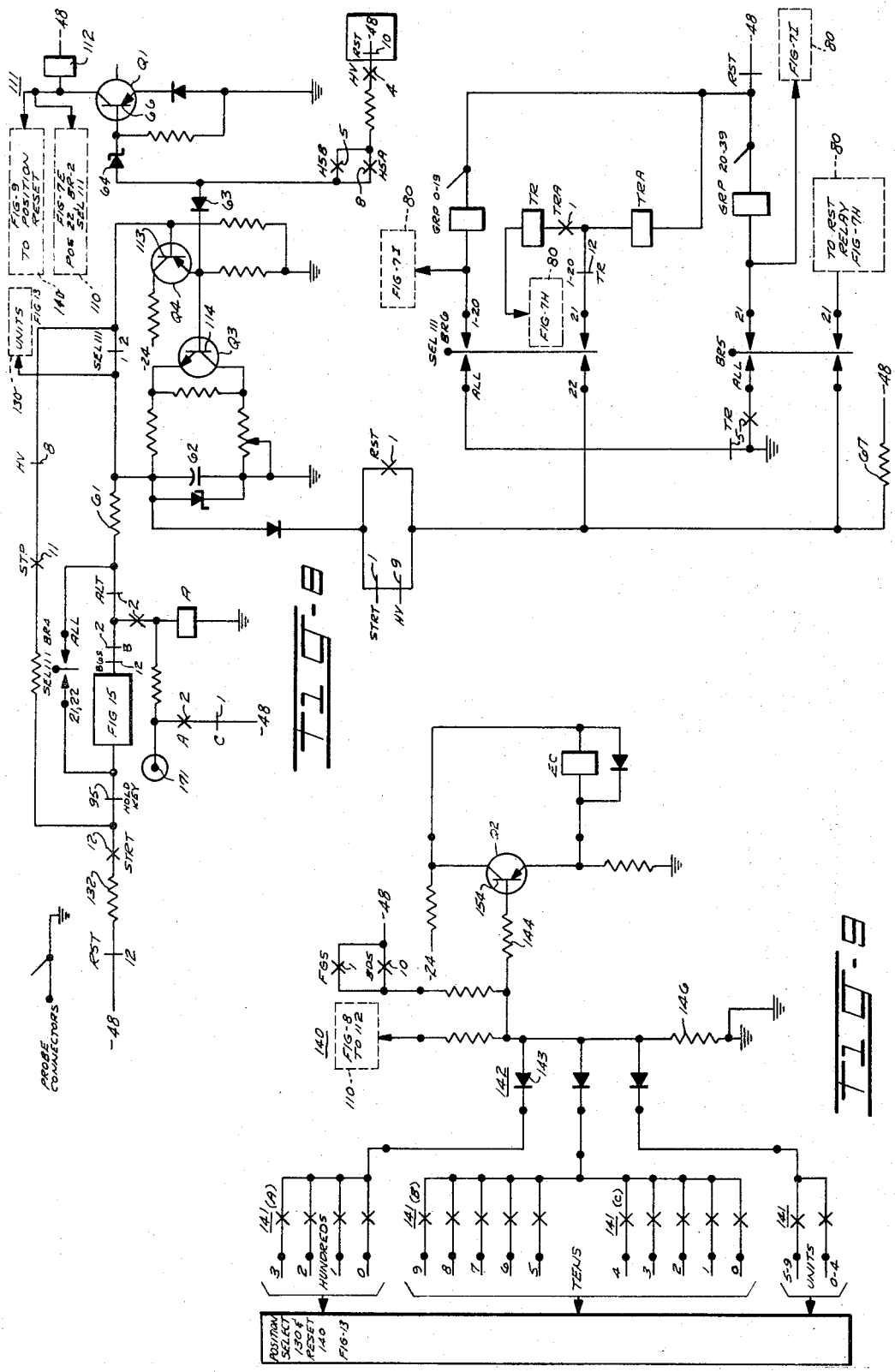

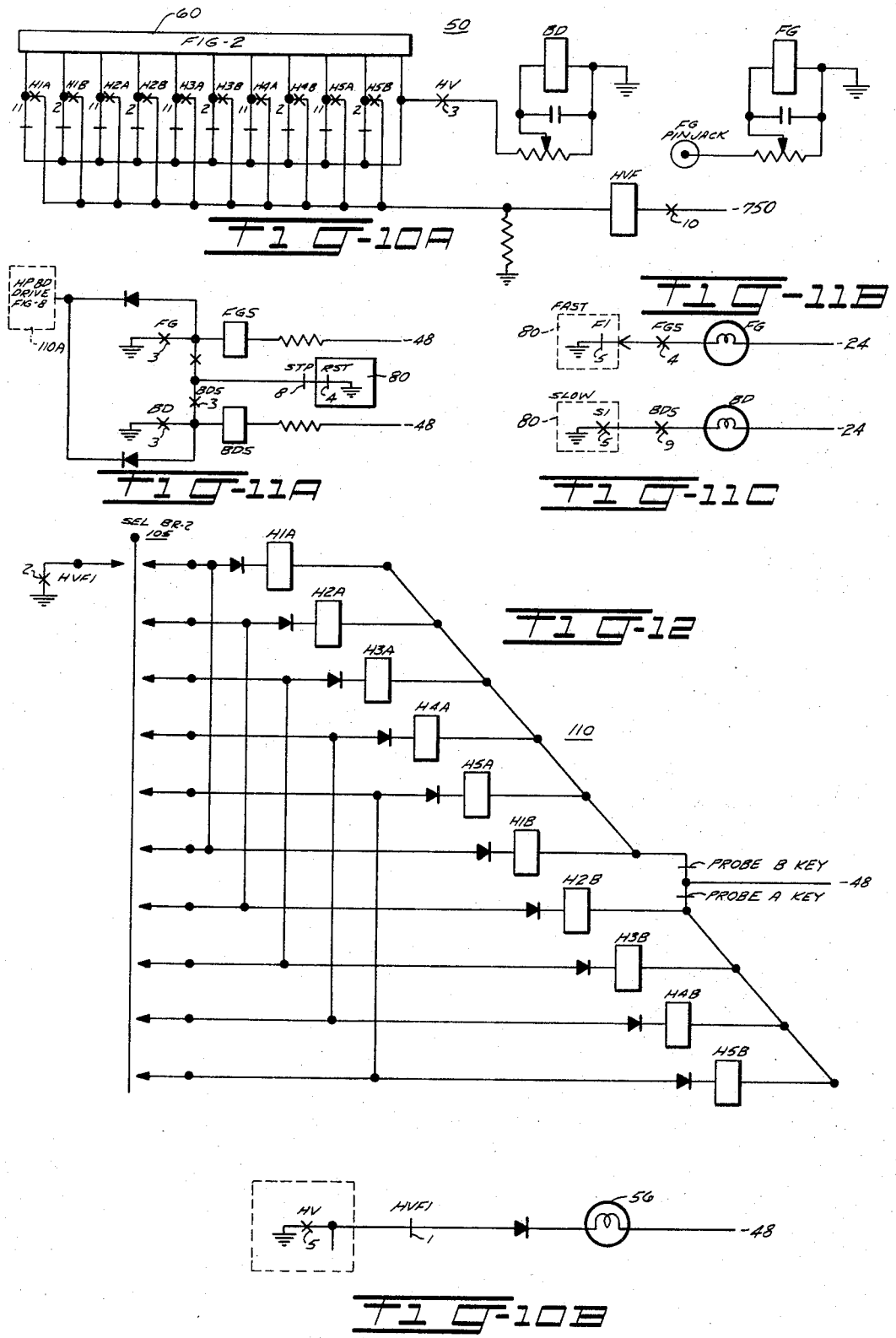

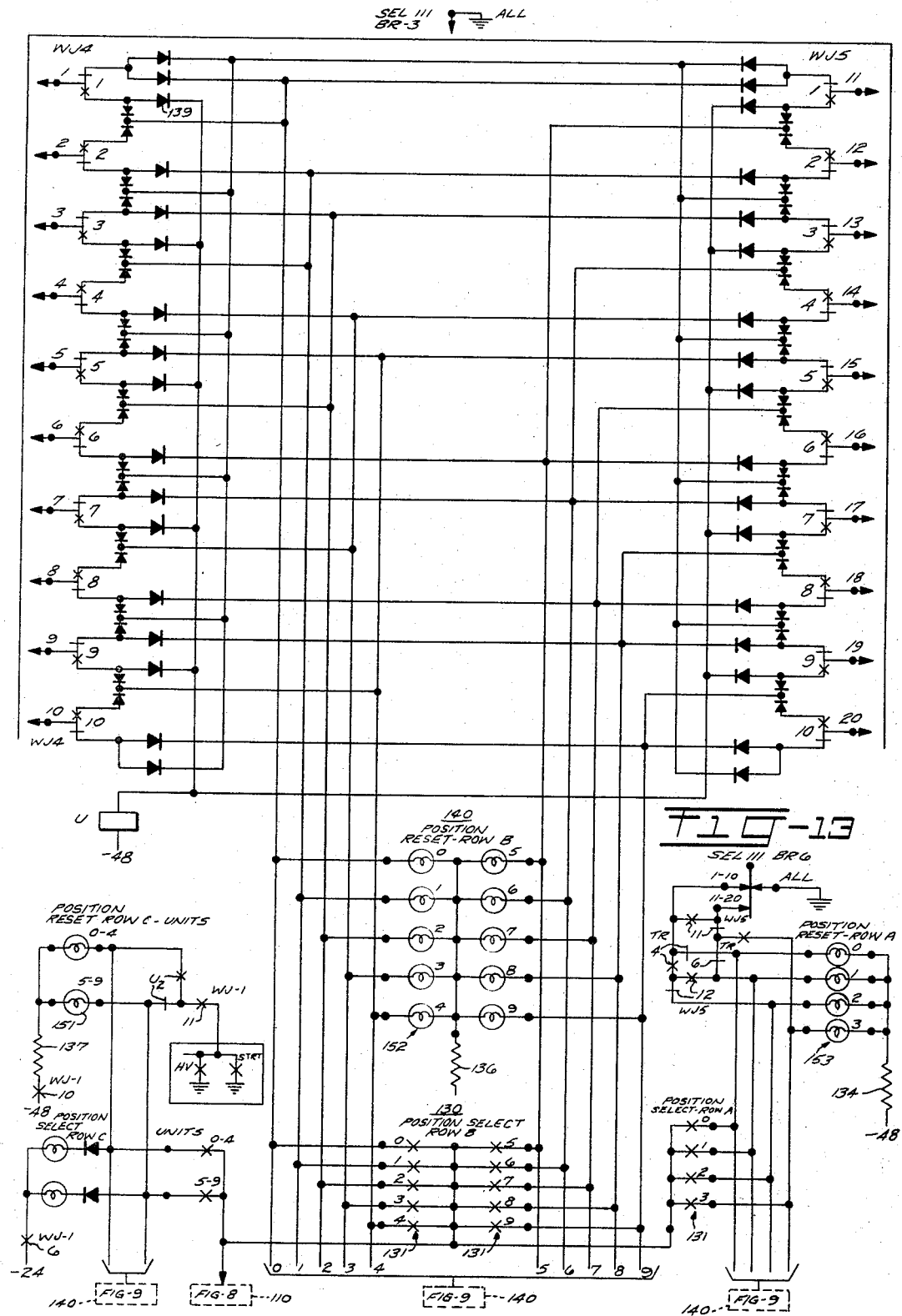

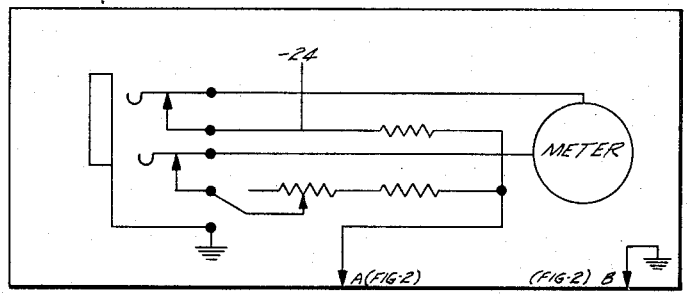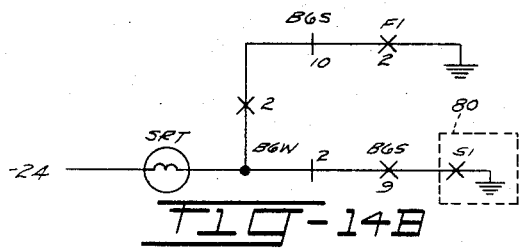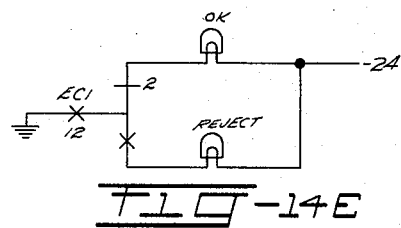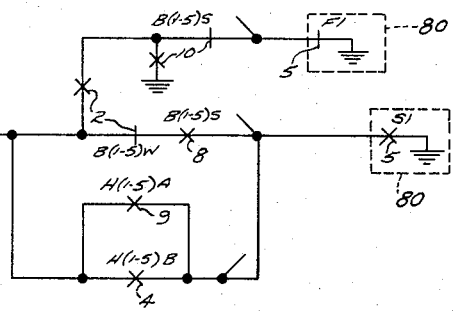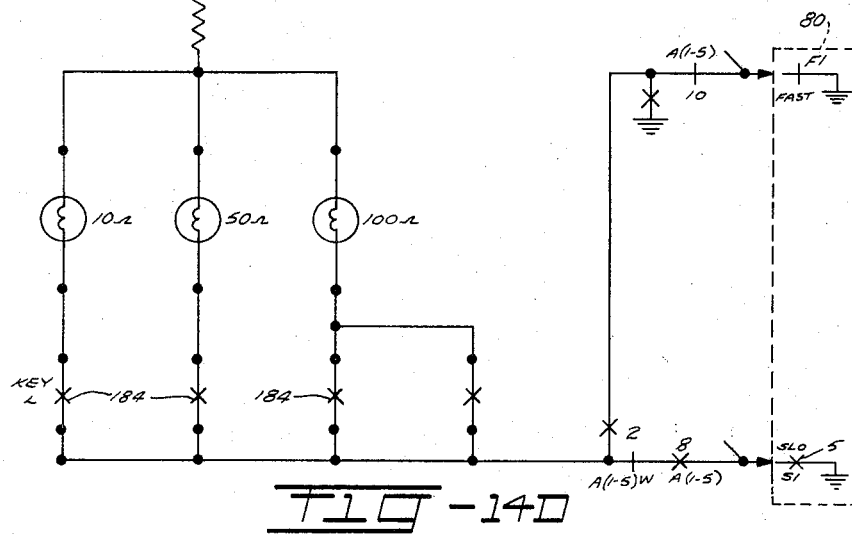

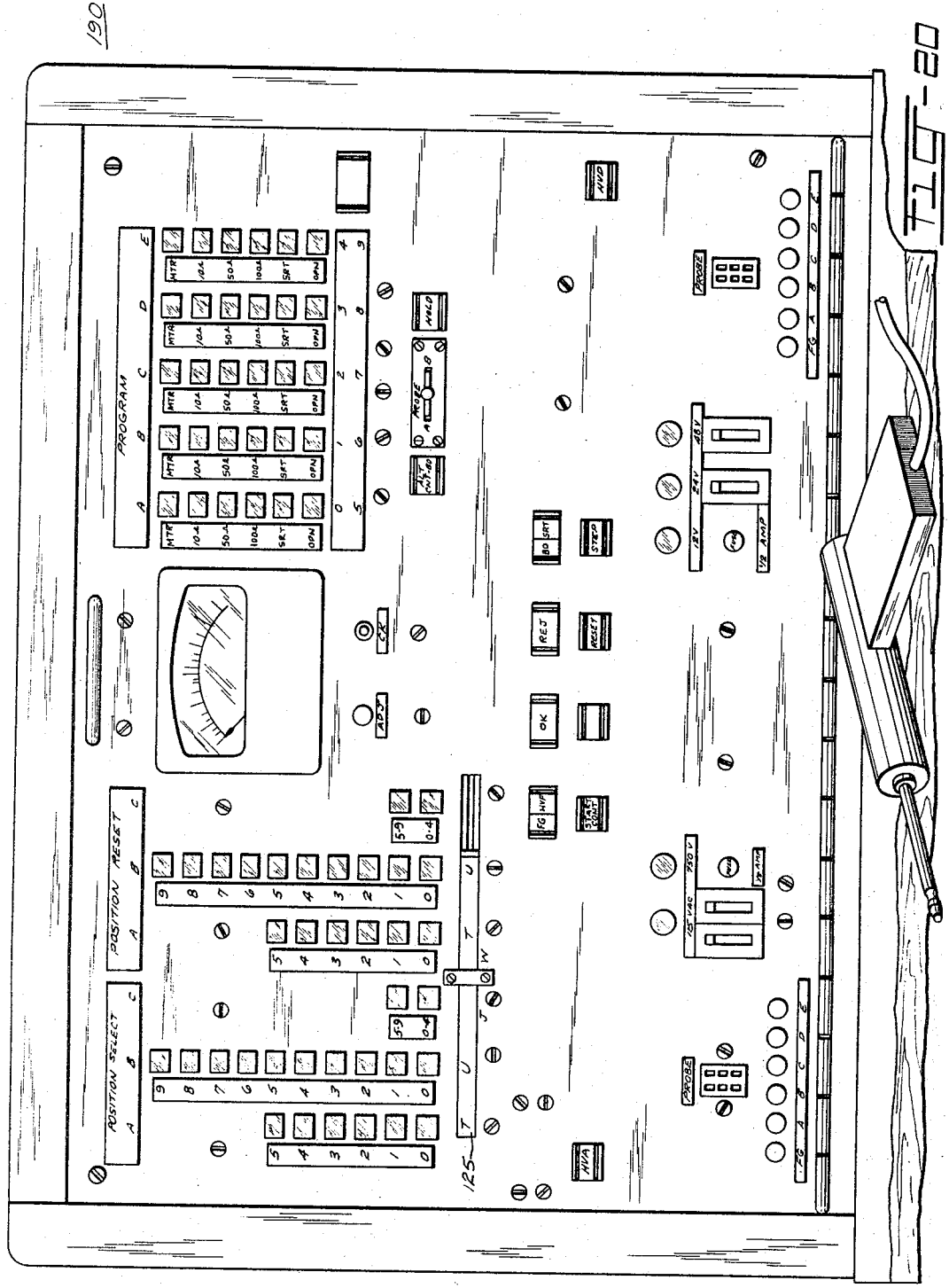

United States Patent Office 3,354,389
Patented Nov. 21, 1967

3,354,389
AUTOMATIC HIGH SPEED TEST APPARATUS FOR TESTING CONTINUITY AND SHORTS SIMULTANEOUSLY ON A PLURALITY OF CIRCUIT PATHS
Theodore L. Hordosi, Berkeley Heights, N.J., assignor to Western Electric Company, Incorporated, New York, N.Y., a corporation of New York
Filed Oct. 24, 1963, Ser. No. 318,606
9 Claims. (Cl. 324—73)

ABSTRACT OF THE DISCLOSURE

An automatic high speed continuity and breakdown test apparatus for testing a variety of communications circuits such as switchboard circuits. The continuity and breakdown tests are conducted simultaneously on a plurality of circuit paths and means are provided for indicating the faults and stopping the progression of the test.

---

This invention relates to electrical test apparatus and particularly to apparatus for performing continuity and breakdown testing on an automatic high-speed basis.

In the manufacture of electrical equipment, particularly equipment related to the communications field, numerous solder or solderless connections are required to join conductors and components in complex circuit patterns. For reliability of service it is axiomatic that such connections must be made accurately and be free from defects which could affect the electrical operation of the equipment. Furthermore, since it is usually far more costly to correct errors in the field than to detect and correct them during manufacture, the development of satisfactory shop testing apparatus has become an economic necessity. Adding to the problem, the design of automatic test apparatus to verify the proper operation of wired circuits before shipment has been hampered both by changing circuits requirements and the ever-increasing variety of circuits. Consequently, present test apparatus still requires a great amount of manual effort to test for continuity and breakdown conditions which in a sense are determinative of end product quality.

It is, therefore, evident that a need exists for a rapid versatile test apparatus which will provide a more economical means of testing a wide variety of circuits such as wired patchjack or switchboard circuits. To achieve the desired economies, the apparatus should be capable of testing a plurality of circuits for a number of electrical requirements in a single setup with minimum connecting and disconnecting or to put it in more general language with minimum operator manipulation of the test equipment. The apparatus should also be easy to maintain and simple to operate. Furthermore, in testing a plurality of circuits for continuity, the apparatus should be capable of detecting open and short circuit conditions and wiring reverses between separate and independent electrical paths.

Accordingly, an object of this invention is to automatically test electrical circuits with new and improved apparatus.

Another object of this invention is to rapidly test a variety of communication circuits for continuity including opens and wiring reverses, high potential breakdown and low potential short breakdown.

A further object of this invention is to simultaneously test a plurality of circuits, including means for indicating the particular circuits under test and also means for advancing or resetting the test apparatus when desired.

A more specific object of this invention is to rapidly test a plurality of wired patchjack or miscellaneous switchboard circuits for continuity and breakdown conditions in a single setup, a continuity and low potential short test being performed simultaneously on the plurality of circuits and a high potential breakdown test being performed successively on the circuits.

In general, the test apparatus embodied herein provides an economical means for testing a variety of communications circuits such as switchboard circuits. An input circuit connects a group of circuits to the apparatus for test purposes. A program board sorts the input paths of the circuits under test for continuity checks in the proper sequence and connects low potential short or high potential breakdown detectors to the circuits under test through a switching arrangement. The actual continuity and low potential short test operations are performed simultaneously upon the various circuits within a particular group while the high potential breakdown test is performed successively on the circuits. Means are provided for detecting crossovers between the circuits due to wiring errors which would ordinarily furnish a satisfactory continuity indication.

The switching circuit rapidly selects circuits for testing, connecting them to a plurality of detectors in groups comprising a number of circuits equal to or less than the number of detectors provided. Logic circuits are provided to check that the reactions of the detectors agree with the programmed instructions at each step and a switching circuit control programs the switching circuit and detectors to perform the various tests and switching operations in the proper sequence.

The output of the logic circuit and the switching circuit are fed to indicating circuits for interpretation of test results and indication of the particular circuit under test. Further innovations in the test equipment include means for rapidly advancing the switching circuit to place a particular circuit in a test position and means for automatic reset of the apparatus after the last circuit has been tested.

A more complete understanding of the invention may be obtained from the following detailed description of one preferred embodiment thereof when read in conjunction with the accompanying drawings, wherein:

FIG. 1 is a block diagram illustrating the connection and association of the more important interacting circuits;

FIG. 2 shows a continuity detector circuit;

FIG. 3 illustrates an arrangement of power supplies integrally connected with the apparatus;

FIG. 5 shows schematically the more important elements of the end of cycle, position select and position indicate circuits;

FIG. 6 illustrates an unbalance detector of the type normally used in the continuity detector circuit of FIG. 2;

FIGS. 7A–7I show the various control circuits for the apparatus;

FIG. 8 is a schematic representation of the switching circuit drive;

FIG. 9 is a detailed schematic representation of the position reset circuit;

FIGS. 10A and 10B show the high potential breakdown detector circuits;

FIGS. 11A–11C show the high potential breakdown trouble indicator circuit;

FIG. 12 shows the high potential breakdown switching circuit drive;

FIG. 13 illustrates in detail the position indicate, the position select, and the position reset circuits;

FIGS. 14A–14E illustrate the various trouble indicator circuits;

FIGS. 15A–15C illustrate the logic circuitry of the apparatus;

FIG. 16 illustrates a control and short detector circuit;

FIG. 17 shows a typical program board arrangement;

FIG. 20 is a pictorial representation of the control panel for the apparatus.

Figure 4:
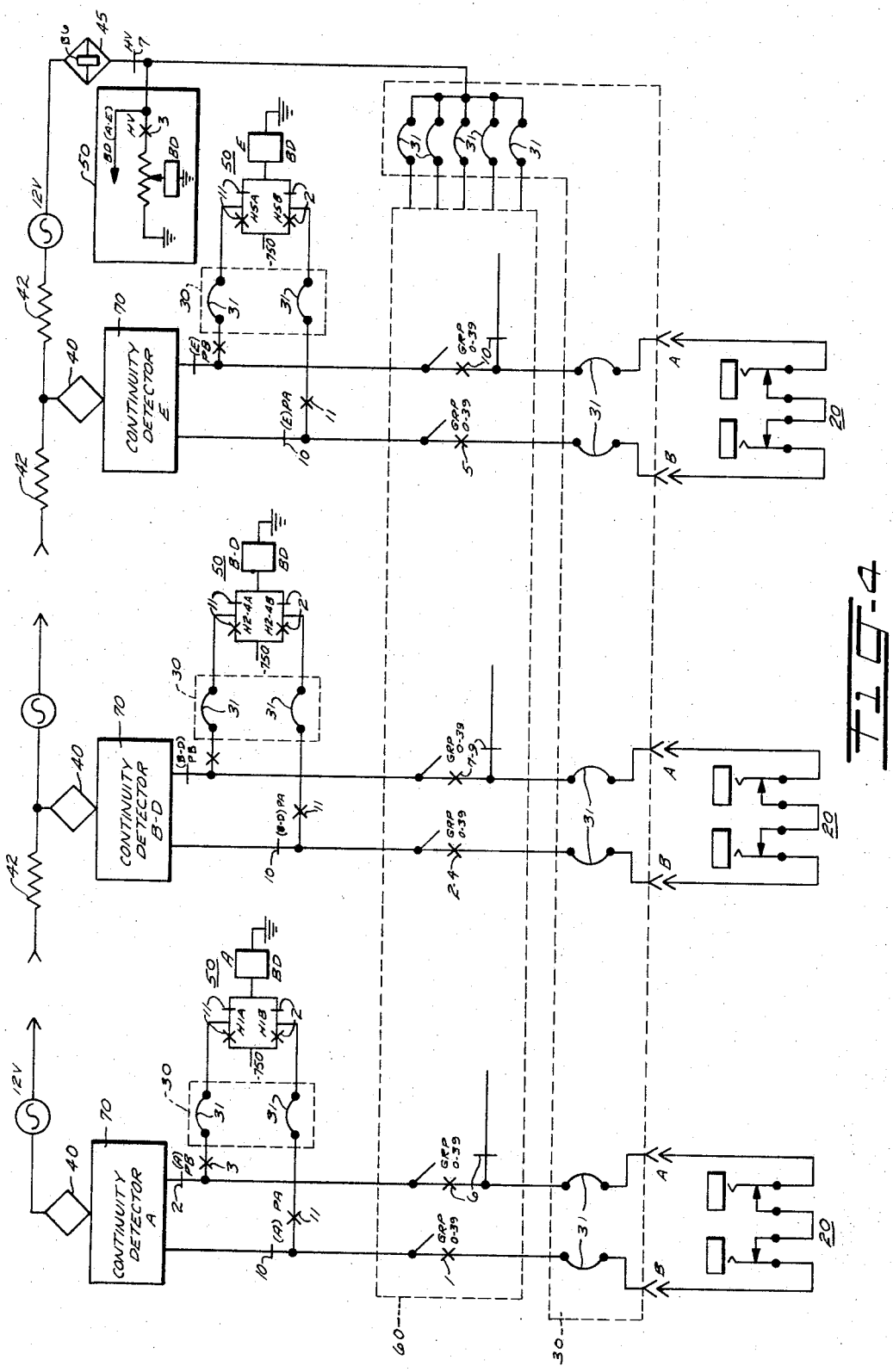
FIG. 4 shows an arrangement of low potential short and high potential breakdown circuits.

With reference to the drawings, it is to be understood that those portions of the circuit representing conventional and commercially available equipment known in the art will not be described in detail. For the sake of clarity, detached contacts are used to represent relay contacts, a cross indicating a make contact and a bar indicating a break when the relay is operated. While a wide variety of circuits may be tested with the subject apparatus, a jack circuit of the type commonly used on switchboards has been selected as the product being tested in a preferred embodiment of the invention. The test apparatus will first be described generally with reference to FIG. 1, which depicts the more important interacting circuits.

As illustrated in FIG. 1, the apparatus includes an input circuit generally designated as 10 connecting the circuits 20 to be tested to the apparatus and a standard type of program board 30 which sorts the input paths for continuity testing in a predetermined sequence. The product under test 20 comprises one or more common jack circuits of the type illustrated.

Connection of the product circuitry to be tested 20 to the apparatus is typically accomplished by means of connecting cords having suitable connectors and connecting fixtures. The purpose of such connecting cords is to connect the ends of all product continuity paths to a specific number of A group or B group test input terminals. In one embodiment, for example, gang connectors are used to connect four groups of 50 wires so that 200 wires can be tested 5 at a time without additional connecting operations.

Where equipment having large numbers of circuits is to be tested the program board 30 connects low potential short detectors 40 or high potential breakdown detectors 50, FIG. 4 to those circuits of the product under test 20 which are not under continuity or breakdown tests at each step. This connection is made through a switching arrangement 60 which rapidly selects circuits for testing, connecting them to a plurality of continuity and short detectors 70 and 40 in groups comprising a number of circuits equal to or less than the number of detectors provided. The circuits 20 are connected to the high potential breakdown detectors 50, one at a time either alternately with the continuity-short test or as a separate operation. Manual and automatic control are provided for the switching circuit 60. The control circuit 80 programs the switching circuit 60 and detectors 40, 50 and 70 to perform the switching and testing operations in a designated sequence. A probe circuit 90 is provided for the detectors 40 and 70 in order to manually detect trouble.

A number of logic circuits 100 are included in the apparatus to check that the operation of the detectors 40 and 70 agree with the programmed instructions at each step. If a fault is detected by any one of the plurality of programmable continuity and short detectors 70 and 40, then the logic circuit 100 opens the operating path of the switching circuit drive 110B stopping the apparatus and feeding a fault signal to the trouble indicator 120. If a high potential breakdown occurs, a signal is also fed to the indicator 120 but no signal is sent to the switching circuit drive 110A. While the drive 110B functions continuously during the continuity test until a fault is detected, during the breakdown test the drive 110A functions only when a signal is received indicating an acceptable circuit.

As seen in FIG. 1, the outputs 101 and 51 of the logic circuit 100 and the breakdown detector 50 respectively are fed to an indicating circuit 120 for indication and interpretation of test results. Means are also provided for indication of items such as power on, depressed program keys, type of test in progress and OK or REJECT at the end of the test. The position of a slide switch 125 on the control panel 190, FIG. 20, determines the test position indication count by jacks (circuit groups) or wires as desired. Trouble indication is provided in the illustrated embodiment by flashing detector lamps with a slow flash indicating detection of an unprogrammed condition while a fast flash indicates failure to detect an expected condition. The circuit 120 also includes means for indicating if the switching circuit 60 is immobilized by failure of the high potential source during breakdown testing. For further flexibility, position select 130, position reset 140 and position indicate 150 circuits are connected to the switching circuit 60. These circuits, which will be described later in more detail, permit a high degree of control over the test operation.

With reference to the continuity detector 70, shown in FIG. 2, a plurality of continuity detector channels are provided to test for continuity or lack thereof on successive groups of circuits 20 under test. Only one detector 70 is shown for purposes of illustration with connecting paths to previous and succeeding detectors indicated at 71 and 72 respectively. In the preferred embodiment, five detectors are provided to perform simultaneous tests on successive groupings of five product circuits in a programmed order. Isolated power supplies permit the plurality of detectors 70 to perform their testing functions simultaneously at each step of a driving selector (not shown in FIG. 2) in the switching circuit drive 110. Normally a 12 volt 60 cycle AC input is supplied to the primary 73 of each transformer 74.

Each continuity detector 70 includes a positive acting polarized bridge unbalance detector 160 connected to a resistance bridge 165. The resistance bridge 165 is formed by two 200 ohm ratio arm resistors 166 and 167, one of a plurality of selected standard resistors 168 and the circuitry of the product being tested between terminals A and B. The bridge circuit is completed when corresponding switching GRP relay contacts 1–6 to 5–10 actuated by a conventional stepping arrangement in the switching circuit drive 110B connect to product 20 into the bridge 165. In the illustrated arrangement, a 10, 50 or 100 ohm standard resistor 168 may be connected into the circuit by depressing a corresponding manual key 184. Any one of the plurality of detectors 70 may be programmed independently of the others for the specified values of continuity resistance.

Each bridge circuit is powered by pulsing direct current obtained from the unfiltered output of the full wave bridge rectifier 169. This DC power source polarizes the bridge unbalance signal. As a result, if the error signal is considered positive when the resistance is lower than the standard, then it will be negative when the product resistance is higher than the standard. The bridge power source is unfiltered in order to obtain a pulsing error signal which can be passed through the transformer 162. Thus, when the bridge 165 is unbalanced due to a product resistance lower than the standard, then the pulsing error signal has the proper polarity, permitting it to pass through the series connected diode 161 and the primary winding 183 of transformer 162. Conversely, a product resistance higher than the standard produces an error signal of opposite polarity. This "negative" signal reverse biases the diode 161 in series with the primary winding 183 but forward biases the parallel diode 163 to prevent the signal from energizing the primary winding 183. With a balanced resistance condition no error signal is sensed by the secondary winding 164 which supplies the unbalance detector 160.

When the circuit 20 is acceptable in a continuity sense, it has a lower resistance than the standard resistor 168 in the bridge. Each time this occurs, the unbalance signal from the bridge 165 passes through the transformer 162 to actuate the associated detector 160 which may, for example, comprise a standard transistorized plug-in module which includes a two stage amplifier driving a Schmitt trigger circuit, see FIG. 6. Each of the detectors 70 serves to operate an A or B signal relay in the logic and error indicating circuits 100 and 120 respectively when an acceptable condition is sensed. In a typical apparatus of the type disclosed herein, the sensitivity of the continuity detectors 70 will allow the test apparatus to accept circuits having resistances approximately 10% lower than a selected standard and to reject circuits having resistances equal to or greater than the standard. An ohmmeter 170 may be connected across any one of the circuits in the group under test for calibration purposes and to verify resistance measurements. A probe plug 171 associated with the probe circuit 90 is similarly connected across the product 20 for manual operation.

The purpose of the coupling transformer 162 is to step up the lower potential signals from the resistance bridges 165 to facilitate sensing by the transistorized detectors 160. The transformers 162 also isolate the resistance bridges 165 from the common power supply 172 used for the plurality of detectors 160. It is essential to isolate each circuit 20 under test in order to detect shorts or reverses between the various circuits 20.

The test plug probe continuity circuit 90 of FIG. 1 is provided for testing wired jack strips and repetitive patchjack type circuits. On such circuits, in addition to the continuity test from end A to end B, it is necessary to insert a plug probe 171 into each jack to determine that the wiring is correct and that any auxiliary make or break contacts of the jacks function properly. The operation of the continuity detectors 70 with the probe 171 is essentially the same as it is for testing continuity from circuit end A to end B.

FIG. 3 illustrates a plurality of conventional power supplies which furnish the necessary voltages to the test apparatus. In general, the apparatus operates from —24 v. DC, —48 v. DC, —750 v. DC and 12 v. 60 cycle AC which are provided by a 3 amp 110 v. 60 cycle AC source 25.

FIG. 4 illustrates the interconnections between the continuity detectors 70 to provide means for sensing short circuit conditions or high potential breakdowns between product circuitry 20 connected to detectors 70 and from these circuits to all other circuits connected to the apparatus. As mentioned previously, any number of detectors 70 may be employed depending upon the number of circuits 20 under test but in FIG. 4, only three detector circuits are shown for purposes of illustration.

As best seen in FIG. 2, one winding 41 of each isolation power transformer 74 is connected to form a series circuit with a current limiting resistor 42 between adjacent windings. Current flow detectors 40 connect one leg 46 of each continuity detector 70 to one side of the winding 41 of its respective transformer 74. Consequently, a potential difference exists between any two of the plurality of detectors 70. As a result, current will flow if a circuit between any two detectors 70 is completed through a short in the product 20. This current flow will operate the B short detector relays of the affected circuits. The resistors 42 limit the current so that the same current will flow in the circuit whether the short is between adjacent circuits or between circuits connected to the end detectors even though the series connected transformer windings 41 provide a greater potential difference in the latter case. On the other hand, test apparatus of the prior art is generally unable to detect reverses which might provide a satisfactory continuity indication and, as a result, the circuit paths must be tested sequentially or complex circuitry to feed different frequencies to the various paths must be provided.

Those circuits of the product under test 20 which are not connected to the continuity detectors 70 are connected through the switching circuit 60, i.e., normally closed contacts of GRP 0–39 relays and the program board 30 to another short circuit detector 45. This detector 45 is connected through a limiting resistor 42 to the winding 41 of the last series transformer 74. Therefore, a potential difference will exist between these wires and those for which the particular GRP relay is operated for continuity testing. A short circuit from one of the wires under continuity test to one not under continuity test will permit current flow through the detector 45, the transformer windings 41 and series resistors 42 to the affected continuity circuit and from there through the short circuit detector 40 to the wire under test. Thus, the B short circuit detector relays and the corresponding relay of the shorted wire under continuity test will operate to stop the progress of the test and to indicate the trouble visually in circuit 120.

FIG. 4 also illustrates the means for applying a high potential breakdown test to the product 20 under test through the program board 30. Both manual keys 52 and 53, see FIG. 18A, must be depressed and held to perform the high potential test, thereby promoting operator safety during this phase of the test. When these two keys are depressed, the HV relay operates transferring the A ends of the product from the short detector 45 to the breakdown circuit 50. The pairs of relays A(PA) and A(PB) to E(PA) and E(PB) respectively, also operate, connecting the ends of the one or more circuits under test 20 to the grounded high potential breakdown detector 50 through closed contacts of the non-operated pairs H1A and H1B to H5A and H5B. When the last relay pair H5A and H5B operates to apply a predetermined high voltage, for example, 750 volts to the last of the circuits in each group, the switching circuit drive 110 is actuated. As relays H5A and H5B release, the drive 110 advances to operate the succeeding GRP relay in order to connect a succeeding group of circuits for breakdown test. This action is repeated for each group of circuits to be tested.

The high potential breakdown test may be integrated with the continuity test. According to this method continuity is first verified simultaneously in the different paths in a group and then the high potential breakdown is applied successively to each of the circuits. This facilitates testing patchjack circuits because normally closed contacts are opened when the probe plug 171 is inserted. Of course, it is entirely possible to check all the circuits under test 20 for continuity and then perform breakdown test on each of the circuits under test 20. This method, however, requires insertion of dummy plugs into the jacks to open closed contacts.

FIG. 5 illustrates schematically the end of cycle, position select 130 and position indicate circuit 150. Units, tens and hundreds indicating lamps 151, 152 and 153 are connected to indicate the circuit 20 under test. One lamp in each group lights to provide digital read out under control of the advancing switching circuit 60. When indication by test steps or individual jack circuit numbers is desired, as on regular switchboard jack strips, the operation of a slide lever 125, FIG. 20 changes the connections and designations of the lamps. In this mode, the unit lamps 151 are not used, the tens lamps 152 become units and hundreds become tens.

A position select feature 130, shown in FIG. 5 is included in the circuit for advancing the apparatus rapidly to a higher numbered test position. Position select keys 131 are depressed connecting —48 volts through the associated lamp to the switching circuit drive 110. This advances the selector 111 until the switching circuit 60 applies ground to light the associated position indicator lamp. The ground also shunts down the bias on the drive lead to stop the switching circuit 60 at that test position. This circuit action will be explained later in greater detail.

To reset the apparatus automatically with reset circuit 140 after verifying the last circuit, the number of the last circuit or test step is registered by depressing the associated units, tens and hundreds position reset keys 141. The keys 141 lock and provide a negative potential through their associated lamps 151, 152 or 153 and through the isolating diodes 142 to bias transistor Q2 to saturation. Q2 may also be forward biased by a negative potential through the selector winding 112 or from either the frame ground FGS relay contacts 1 or breakdown signal relays BDS contacts 10 if operated. When the switching circuit 60 advances to a test position which lights the lamps corresponding to all of the depressed position reset keys 141, then the negative potentials through these keys 141 are shunted to ground and transistor Q2 is kept saturated only by the negative potential through the selector winding 112. Upon concurrence of the detector indications with the program, the logic circuit 100 permits the selector drive circuit 110 to ground the winding terminal of the selector 111 to advance the circuit. This ground shunts out the remaining negative source to the base of Q2 and allows it to cut off. With Q2 cut off, relay EC operates to indicate end of cycle and to trip the RST relay FIG. 7G which resets the apparatus.

The probe circuit 90 of the test apparatus provides means for verifying the proper wiring of the tip, ring and sleeve terminals and their associated break or make contacts in a large variety of jack circuits. It also provides means for checking continuity and breakdown in alternate steps in each jack circuit when the probe 171 is inserted into the jack. This eliminates the necessity of inserting dummy plugs into each jack to open its break contacts during the high potential test.

In order to augment the preceding more generalized description, certain of the test circuit sub-assemblies will now be described in greater detail. The continuity and low potential short test circuits 70 and 40, however, have already been described in considerable detail, so the immediately following exposition will focus mainly on the unbalance detector circuit 160, of FIG. 6 and the test plug probe continuity test circuit 90. The operation of the other test circuit sub-assemblies will be discussed in detail later on.

Accordingly, the unbalance detector 160 comprises a sensitive plug-in unit capable of sensing low voltage small current error signals due to wheatstone bridge unbalance. In the present embodiment it is intended to be used in conjunction with A 1–5 signal relays having a 620 ohm winding which operates on approximately 20 milliamperes. The detector 160 if properly adjusted should maintain the relays A 1–5 in a nonoperated condition when the wrong polarity signal or no signal is applied at the input and should operate the relays when a .1 volt signal of the proper polarity is applied to the input.

The circuitry of transistors Q7 and Q8 in the unbalance detector 160 forms a monostable multivibrator because of the feedback through the common emitter potentiometer 173.

If the potential on the base 178 of Q7 is less negative than the potential on the common emitter junction 177 of Q7 and Q8, then Q7 will be cut off and Q8 will be forward biased through resistors 174 and 176 in series. Transistor Q8 will connect the external A 1–5 relays to −24 v.

If the potential at the emitter 175 of Q6 causes the base 178 of Q7 to be slightly more negative than the potential on the common emitters 179 and 159 of Q7 and Q8, then Q7 will start to conduct causing a potential drop on its collector 158 thus reducing the negative bias at the base 157 of Q8. Q8 will, as a result, begin to cut off with a resulting decrease in current flow through the common potentiometer 173. The reduction in current in 173 causes the potential at the emitters 179 and 159 of Q7 and Q8 to be reduced. Consequently, the potential difference between the common emitters 179 and 159 and the base of Q7 increases to cause the latter to become even more conductive. This action causes a sudden switch with Q7 becoming conductive and Q8 cut-off.

If Q6 with approximately 4 volts on its collector 156 is now partially shut off, then the potential on its emitter 175 will decrease to bias the base 178 of Q7 less negative than the emitters 179 and 159 of Q7 and Q8 to reverse the switching action.

The bias to the base 154 of transistor Q6 is controlled by transistor Q5. With Q5 at cut-off, transistor Q6 is biased to full conduction providing a potential of approximately 3.75 volts on its emitter 175. Potentiometer 149 should be adjusted to the same value and potentiometer 173 adjusted so that the potential drop thereacross is just slightly less. Q7 then becomes conductive, Q8 non-conductive and the A 1–5 relays non-operated.

With no power supplied to the resistance bridge 165, the potentiometer 149 may be adjusted until the A 1–5 relay operates and then backed up until the A 1–5 relay releases again to obtain a very sensitive setting. The circuit is polarized for DC bridge 165 so that depending on the connection an error either on the high side or on the low side will trigger the detector 160 to operate the A 1–5 relays. Transistor Q5 will become more conductive only if the signal is polarized causing its base to become more negative.

The test plug probe continuity test circuit 90 is provided for testing wired jack strips and repetitive patchjack type circuits. In circuits of the aforementioned type, in addition to the continuity test from end A to end B, it is necessary to insert a plug probe 171 of the type shown in FIG. 19 into each jack to determine that the wiring is correct and that any auxiliary make or break contacts of the jacks function properly.

The operation of the continuity detectors 70 with the probe is essentially the same as it is for testing continuity from circuit end A to circuit end B. The only difference occurs in the switching circuit 60 associated with each of the five continuity detectors. This switching circuit 60 provides means for disconnecting either the A side or the B side of the jack circuit from the associated side of the resistance bridge 165 and transferring it through the program patch jumpers 31 (when provided) to the short detector circuit 40 and means for transferring the disconnected side of the resistance bridge 165 to the associated terminal T, R or S (Tip, Ring or Sleeve) of the probe 171. This provides the means for checking continuity to the T, R and S terminals of the jack as the probe 171 is inserted.

In connection with the above feature, circuitry is also provided for programming and performing continuity and breakdown testing alternately on each jack when the plug probe 171 is inserted. This facilitates high potential breakdown testing of jacks using the test probe 171 to open normally closed contacts. Thus the time consuming insertion of dummy insulating plugs is eliminated in testing patchjack circuits.

In FIGS. 1 and 4, the product to be tested 20 comprises a typical patchjack circuit 20. The illustration may represent the tip, ring, or sleeve circuit of a patchjack. In practice all circuits, T, R, S and auxiliary contacts, associated with a jack are tested simultaneously to a maximum of five continuity paths per test step in the preferred embodiment of the apparatus.

After completion of continuity test from cable end A to cable end B, the test apparatus is prepared for continuity testing with the probe plug 171 by operation of the probe key 91 to (A) or to (B), depending on the input side A or B to which the jacks to be probed are connected, see FIG. 7C.

In greater detail, the probe A key operated prepares the test apparatus for probe testing the A jack (FIG. 1). It connects a ground path through the probe program patches 31 provided in the plugboard to operate the required relays A–E (PA), see FIG. 7C. Only those relays of the group will operate which are connected through the program patch board 30 to the probe A key 91. The probe relay designations indicate the number of continuity circuits to be tested per step with five as a typical maximum, i.e., tip, ring, sleeve, etc.

Contacts 10 of relays A–E (PA) when operated disconnect the B ends of the circuits 20 under test from the resistance bridge 165 and connect the ends to the short detecting circuit through the program plugboard 30, i.e., when patch jumpers 31 are provided for this purpose. The above relays (A–E) PA when operated also connect the B side of the resistance bridge 165 to the terminals T, R and S of the probe plug.

The test apparatus is now ready for testing with the probe 171 and the start continuity key 94, FIG. 7B, should be depressed. The key 94 momentarily depressed will operate the STRT start relay to advance selector 111 to position 1 as later described. In this position the GRPO relay is operated by ground over Brush 1 of the selector 111. Relay GRPO operated connects the A end of the circuits 20 to be tested to the A end of the resistance bridge 165 through the normally closed contacts of the nonoperated A–E (PB) and MTR 1–5 relays. The operated GRPO relay also connects the B ends of the circuits under test to the short detector circuit through the closed contacts 10 of the operated relays A–E (PA), FIGS. 2 and 4.

At this point the test apparatus stops and indicates "OPEN" on all detectors for which continuity is programmed since the plug is not inserted and will indicate "SHORT" for circuits in which break contacts of jacks provide continuity from end A to end B when the probe 171 is not inserted.

When the plug probe 171 is inserted into the first A jack, it completes the continuity paths shown in FIG. 2 over the tip, ring and sleeve to the A side of the resistance bridge 165 from the B side through the closed contacts 10 of the operated PA relays, over the probe 171 and back through the closed contacts 2 of nonoperated PB relays and contacts 11 of relay MTR. Insertion of the probe 171 also opens the cutout contacts of the jack to break continuity from end A to end B. If all the expected continuity paths in the circuit under test are complete and if no unexpected shorts are found, then the switching circuit drive 110 will be biased over the normal advance path to step to the next test position. The indication will again be open to test for shorts on each detector circuit involved in the test.

The B jacks are probe tested in the same manner as the A jacks except that the probe key 91 of FIG. 7C is operated to B to operated to A–E (PB) relays, and release the A–E (PA) relays. The continuity paths under test will now run from the A side of the resistance bridge 165, through contacts 2 of the operated PB relays through the probe 171, the B jack, the jumpers 31, the closed contacts of the operated GRP relay and through the normally closed contacts 10 of relays A–E (PA) and contacts 11 of MTR 1–5 to the B side of the resistance bridge 165. This time the A cable end of each circuit is connected to the short detectors 40 through the closed contacts 11 of relays A–E (PB).

As previously described, a low potential short circuit detection is provided, see FIGS. 2 and 4, between each wire and all other wires of the product 20 under test. The windings 41 of the five transformers 74 are connected in series through resistors 42 located between adjacent windings 41. Current flow detectors 40 comprising rectifiers 44 and relays B1 to B5 connect one leg 46 of each continuity detector bridge 165 to one side of the winding 41 of its respective transformer 74. Consequently, a potential difference exists between any two of the five detectors 70. This potential difference will cause a current flow if a circuit between any two detectors 70 is completed through a short in the product 20. This current flow will cause the B detector relays of the affected circuits to operate. The resistors 42 limit the current so that the same amount of current flows in the circuit whether the short is in adjacent circuits or in circuits connected to the end detectors 70 even though the series connected winding 41 cause a greater potential difference in the latter case.

Those wires of the product 20 under test which are not connected to the continuity detector 70 are connected through the normally closed contacts 6 of the GRP relays and through the program board 30 to the short circuit detector 45 formed by rectifier 44 and relay B6. This detector 45 is connected through the resistor 42 to the winding 41 of an adjacent transformer 74. Therefore a potential difference will exist between these wires and those for which the GRP relay is operated for continuity tests. Any short circuit between one of the wires under continuity test and one not under continuity test will cause a current to flow through the rectifier 44, the windings 41 and series resistors 42 to the affected continuity circuit and from there through the short circuit detector 40 to the wire under test. Thus, in such a case the short circuit detector relays B6 and one or more relays B (1–5) of the detector associated with the shorted wire or wires under test will operate to stop the progress of the test and to indicate the trouble visually.

Each circuit of the product under test may be tested against all others for high potential 750 v. DC breakdown. This test may be performed by operating the keys 52 and 53 (FIG. 18A) simultaneously to connect the A end of all circuits of the product 20 under test through a current flow detector relay. As the switching circuit 60 advances it disconnects one circuit at each step and applies 750 v. DC to the circuit. If no current flows through the current detector in approximately 1/10 second then the circuit under test is considered to have no high potential breakdown to any other circuit connected to the test apparatus. The high potential test may also be performed by operating key 76 (FIG. 7A) when the test probe 171 is used for checking continuity of jack circuits. This permits testing for high potential breakdown between cutout contacts of jacks when they are opened by insertion of the test plug 171. This method also checks each circuit against all others.

Figure 18A:
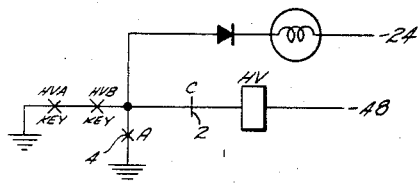
FIGS. 18A–18D show additional circuits of the high potential switching circuit drive.

Operation of both keys 52 and 53 in FIG. 18A provides a ground connection for operating relay HV. Relay HV operated, closes contact 12 to provide a locking path for relays RST and EC 1, FIGS. 7G and 7B respectively, if either should operate and to provide a ground for lighting the 0–4 or 5–9 lamps when relay WJ–1 (FIG. 8) operates. Contacts 5 close to provide a ground path for lighting lamp 56 (FIG. 10B) if the HVF1 relay is non-operated because of high potential failure, and to provide a ground path to operate all relays (A–E) PA and (A–E) PB through their respective isolation diodes. Relay HV also opens contacts 9 to break the reset bias circuit of transistor Q1, see FIG. 8, opens contacts 6 to break the locking ground path for relay EC1, FIG. 7B, and opens contacts 8 to break the manual step bias path to transistor Q1. HV contacts 3 close connecting the BD relay of FIG. 10A to the short circuit detector paths of the test apparatus and contacts 11 close to provide a circuit for operating the STP 2 relay of FIG. 18B when selector 105 is on step 11 or 22 and the contacts 1 of the ALT relay of FIG. 7A are closed or when contacts 3 of relay A are closed and contacts 1 of relay B are closed. Operation of the HV relay causes contacts 10 to close connecting the −750 v. source to the switching circuit 60 and to operate relay HVF, opens contacts 2 to open the reset path through the closed contacts 3 of the ALT relay and through the diode 54 to the winding of the RST relay, closes contacts 2 to provide a path for operating relay STP 2 when selector 105 is on steps 1–10 or 12–21 and the selector magnet is not energized. This is the normal advance path during the breakdown test. Relay STP 2 operates after capacitor 57 becomes changed and opens contacts 2 to prevent triggering the RST relay by the operating ground for the STP 2 relay.

Figure 18B:
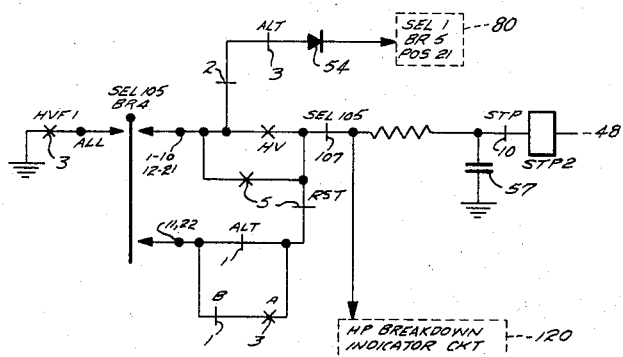

Relay STP 2, FIG. 18B, when operated closes a ground path to energize the winding 106 of selector 105. Selector 105 when energized sets its pawl and ratchet in preparation for advancing its brushes and also opens its break contacts 107 to open the operate path of relay STP 2. Relay STP 2 when released opens its contacts to de-energize the winding of selector 105. The winding 106 of selector 105 becomes de-energized allowing its brushes to advance to the succeeding step position and closing break contacts to re-establish the timed operating path for relay STP 2. Relay STP 2 and selector 105 operate and release as described above at approximately ten steps per second.

On steps 11 and 22 of the selector 105 the operate path for relay STP 2 is either through the normally closed contacts 1 of the ALT relay or the closed contacts 1 of relay B and contacts 3 of relay A. Selector 105 on successive steps 1–5, 6–10, 12–16 and 17–21 operates relay pairs H1A and H1B through H5A and H5B in consecutive order.

FIGS. 2 and 4 illustrate the circuit arrangement for high potential breakdown testing. The A end of each product 20 is connected through the closed break contacts of the associated non-operated relays GRP 0–39 over the program board HP jumpers 31, through the closed contacts 3 of relay HV and through the breakdown detector circuit 50 to ground. As each GRP relay operates in succession the A and B ends of the products under test 20 are connected through the closed contacts of the operated relays H1A–H5A and through to the BD detector to ground. Thus all wires connected to the test apparatus are grounded.

As each successive relay pair H1A, H1B, to H5A, H5B is operated in the previously described manner, the A and B ends of the associated circuit within the group are lifted off ground and connected to the current limited 750 volt potential source for about one tenth of a second. When relays H5A and H5B operate to apply 750 v. to the fifth circuit in the group, they apply a −48 v. potential through their contacts 8 and 5 to the base of transistor Q1 to energize selector 111. As relays H5A and H5B release under control of selector 105 they remove the negative (forward biasing) potential from Q2 and selector 111 advances to operates the next GRP relay. The sequential operation of the H1–5A and H1–5B relays and subsequent advancement of selector 111 continue until the end of the test is reached and the RST reset relay is operated by the end of cycle circuit.

Relay RST operated, see FIG. 7G, of the control circuit 80 closes contacts 1 as shown in FIG. 8 to provide a reset bias for the drive circuit of selector 111 and closes contacts 5 in FIG. 18B to provide a reset path for selector 105. Relay RST remains locked up through the closed contacts 12 of the operated relay HV to prevent recycling of the test should be the tester continue to hold down keys 52 and 53. When keys 52 and 53 are released at the end of the test then relay HV of FIG. 18A also releases and permits relay RST to release.

Should keys 52 and 53 be released before the end of test then relay HV will release and close its contacts 2 to provide a path for the next ground pulse to trigger the reset relay RST through isolating diode 54, see FIG. 18B. This permits the test apparatus to reset without an OK indication.

To perform an alternate continuity-breakdown test on a plurality of jack circuits, the ALT key 76, FIG. 7A, is operated in addition to the probe A or probe B key 91 to prepare the apparatus for alternately testing continuity and breakdown on each jack before proceeding to the next jack with the plug probe 171. With the ALT key 76 operated, verification of satisfactory continuity and short conditions through the probe 171 is indicated by a lighted lamp 180 located on the end of the test probe see FIG. 19. The breakdown test for the probed jack is initiated automatically and its satisfactory completion is indicated by the probe lamp 180 being extinguished and the apparatus advancing to the next test position. Each time the apparatus advances, open and short indications will be given until the probe 171 is moved to the jack under test. If a fault occurs, the defective circuit may be circumvented either by operation of key 181 on the test apparatus or the key 182 in the side of the plug probe 171.

As shown in FIG. 7A, key 76 when operated prepares a ground path for operating the ALT relay through contacts 12 of any relay (A–E) PA or contacts 12 of any relay (A–E) PB when the latter are operated. Operation of the start key 94 in FIG. 7B will initiate an automatic continuity and low potential short test from cable end A to cable end B of each circuit successively as previously explained. No high potential breakdown test is performed during this test cycle.

When insertion of the probe establishes the expected continuity paths in the circuit under test and no shorts are found by the detectors, the logic circuit 100 passes a −48 v. potential through (see FIG. 8) resistor 132, the closed contacts 12 of the series connected contacts of the logic circuit (FIG. 15A), the STRT relay, the closed contacts of the hold key 95, the normally closed contacts 12 and 2 of relays B6S and B respectively and through the closed contacts 2 of the operated ALT relay to operate relay A.

Relay A (FIG. 8) when operated closes its contacts 2 to provide its winding with a locking path to ground through the closed contact 1 of relay C and to light the probe lamp indicating that the continuity test was successful and the high potential test is in progress. It also closes its contacts 3 for operating relay STP2 (FIG. 18B) when relay B is non-operated and the brush 4 of selector 105 advances to positions 11 or 22. Relay A operated closes contacts 5 to prepare an operating path for relay B when either relay H5A or H5B operates as the brush 6 of selector 103 (FIG. 12) advances to positions 5, 6, 10 or 21. The A relay when operated also closes its contacts 4 to operate relay HV (FIG. 18A) which functions as previously explained to initiate the high potential breakdown test.

Figure 18C:
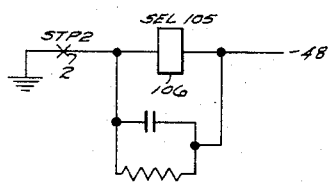
Figure 18D:
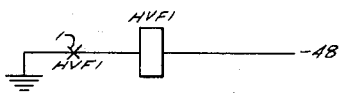

Relay STP2 when operated closes contacts 2 to energize the coil of selector 105 (FIG. 18C). The energized coil prepares the pawl and ratchet of selector 105 for advancing the brushes and opens its break contacts (FIG. 18B) to interrupt the operate path for relay STP2.

Relay STP2 when released breaks the operate path of the selector magnet of selector 105 permitting advance of its brushes. Selector 105 on steps 1–10 or 12–21 provides a ground path through contacts 3 of the HVF1 relay operated, the brush 3 of said selector 105, the closed contacts 2 of relay HV, the normally closed break contact 107 of the selector 105 to operate relay STP2 each time the selector 105 is deenergized. Relay STP2 advances selector 105 through steps 1–10 or 12–21 to apply the breakdown test as explained elsewhere.

When selector 105 advances to either step 11 or 22 it establishes a ground path through its brush 4 and through the closed contacts 2 of the operated A relay to operate relay B to provide a −48 v. potential over brush 2 to bias Q1 (FIG. 8) to advance selector 111 to the next test position.

Relay B (FIG. 7E) when operated closes its contacts 5 to connect its grounded winding contacts to the winding contacts of relay C. Relay C does not operate because it is shunted by ground through terminal 10 or 21 of brush 4 of selector 105. Contacts 1 of relay B open to stop the progress of selector 105 when it reaches step 11 or 22.

When selector 105 is energized by the operation of relay STP 2 through terminal 10 or 21 of its brush 3, its break contact again interrupts the operate path to relay STP 2 to advance the selector 105 to position 11 or 22. As brush 4 advances off its contact 10 or 21 it removes the direct ground from the winding terminals of relays B and C. As a result, current flow from −48 volts through the winding of relay B, the closed contacts 2 of relay A the closed contacts 5 of relay B and the winding of relay C to ground operates relay C. Relay C when operated opens its contacts 1 to release relay A.

Relay A (FIG. 8) when released opens contacts 5 to interrupt the locking circuits of relays B and C, releases the HV relay which opens contacts 5 to release relays (A–E) PA and (A–E) PB. Relay A when released also opens its contacts 2 to break the locking path for its winding and, to extinguish the probe lamp 182 to indicate end of breakdown test.

Relays B and C (FIG. 7E) when released re-establish the circuit to normal, ready for probing the next jack circuit.

The signals A 1–5 and B1S to B5S and watch relays A1W–A5W and B1W–B5W of FIG. 15A, B and C form the logic and memory circuitry 100, of the test apparatus. The watch relays are programmable by means of program keys located on the front panel of the test apparatus. For products 20 not having repetitious circuits, means are provided through the plugboard 30 for programming the watch relays on a step-by-step basis.

The signal relays must be in agreement with the watch relays in order for the switching circuit 60 to advance. The signal and watch relays of each detector will agree showing that an expected situation exists, or they will disagree to show that an unexpected situation was encountered. In the latter case the test apparatus will stop for trouble indication.

The signal and watch relays will pass a signal to the selector drive 110 for the selector 111 to operate only if all the relay pairs are in agreement. The test apparatus uses 5 detectors 70 to test simultaneously for continuity, and six detectors 40 to check for shorts between the detectors. All 5 continuity detectors can be programmed independently. Operating any of the keys 184 in row A will operate the A1W relay. Operating keys marked the same way in the B row will operate A2W relay, keys in the C row operate A3W relay, etc.

If continuity is expected on any of the detectors 70 from the A end to the B end the associated 10, 50 or 100 ohm keys generally designated as 184 should be depressed to operate the corresponding watch relay. If during the course of testing, continuity exists the associated signal relay will operate. The operation of the signal relay is initiated by an unbalanced bridge 165 (FIG. 2) in the associated detector circuit 160 (FIG. 6). The signal relay when operated will close the path to the selector drive 110, through its contacts 12.

If a short is expected between detectors the SRT keys will be operated on these two detectors. The operation of these keys will operate the B1W and B2W watch relays. If a short exists between these detectors signal relays B1S and B2S will operate. The operation of these relays is initiated by the operation of the B detector relays (FIG. 2). The B relays will operate their associated signal relays through contacts 3. The signal relays when operated will close the path for the switching circuit to advance. In some cases it might be necessary to program for continuity from end A to end B and at the same time program for short between 2 or more detectors. To accomplish this result both the A and B watch relays must be operated as required by the product. This objective is attained by the simultaneous operation of the key 96 and one of the continuity keys 184 as warranted by the product 20 under test. When a short is expected between a wire connected to one of the five short detectors 40 and a path not under continuity test, key 97 is operated bringing up the B6W relay. If the short exists the B6S relay will be operated thus closing the path to the switching circuit 60. The B6S relay is operated by the B6 relay through its contacts 3.

As mentioned in general manner, the watch relays can also be programmed by means of jumper wires on the program board 30. From every GRP group relay (FIG. 8) a wire is connected to one terminal of the IBM board.

When the group relay is operated the wire connected to that particular relay will go to ground potential through the contacts of the TR relay. Group relays up to and including 19 will be grounded through contacts 5 of relay TR non-operated; group relays above this number will be grounded through contacts 5 of the TR relay operated.

All the watch relays in the B series, B1W, B2W and B6W have 2 leads, one from each side of the winding leading to the IBM board 30. All watch relays in the A series A1W to A5W have one lead to the IBM board 30, on the same side of the winding where the energizing potential is applied. Potential can be applied through the IBM board ground at any test step to any of the B1W–B6W relays to operate them if they are non-operated or to release them if they are operated. In the same manner any of the A1W–A5W relays can be released by applying ground potential to their associated terminals on the IBM board, through jumper wires connected to the operated GRP relays. This feature greatly increases the versatility of the test apparatus, and facilitates testing of wired components with a different circuit at each test step. In the switching circuit 60, the key 94 operated, closes a path to ground operating relay STRT (FIG. B) to −48 v. and opens a locking path to release relay EC1 if it was previously operated. When operated, the STRT relay locks to ground through its contacts 3 and contacts 3 of the RST relay, closes its contacts 6 to provide a future locking path for relay RST and opens the switching circuit reset path through its contacts 1. The STRT relay also closes its contacts 12 to connect a −48 volt bias through the closed contacts of the non-operated key 95, contacts 21 or 22 of selector 111 (FIG. 8), through resistor 61 to the negative side of capacitor 62 and through the normally closed contacts of selector 111 to bias the base 113 of transistor Q4 to conduction. Q4 conducting provides a negative potential through diodes 63 and 64 to the base 66 of Q1, biasing Q1 to conduction.

Transistor Q1 when conductive energizes selector 111. When energized, selector 111 readies its pawl and ratchet to advance its brushes to position 1 when its winding becomes deenergized and opens its break contacts to remove the conductive bias from transistor Q4 and to cause the base 114 of transistor Q3 to become positive or forward biased.

Q3 when forward biased, discharges capacitor 62 so the latter can start timing the next pulse when the selector 111 contacts close. Transistor Q4 when cut-off, cuts off transistor Q1 and this in turn releases selector 111.

Selector 111 when deenergized, advances its brushes to position 1, closes its break contacts to reconnect the base 114 of Q3 to the negative bias and thus cuts off conduction of Q3 and permits capacitor 62 to pick up charge once again. On position 1, selector 111 connects a ground path to operate relay GRP0 which connects the continuity detectors 70 to the first five circuits under test and disconnects the start path through brush 3 terminal 12. As a result, the base 66 of transistor Q1 must be biased conductive over a circuit through the series of closed contacts formed by pairs of relays A1, A1W; —B6, B6W.

These relay pairs form the continuity logic circuit 100. Each pair must be in the same state (operated or not operated) for the bias circuit to be complete. If the product is fault-free then the selector 111 advances rapidly through steps 1–21 to operate successively designated grouping relays GRP0–19 on step 21 brush 6 of selector 111 and connects ground potential to the upper winding terminal of relay TRA.

Relay TRA (FIG. 8) when operated closes contacts 1 to provide its own winding with a locking path to ground through the winding of relay TR and also to operated relay TR after selector 111 disconnects the operating ground from relay TRA by advancing off step 21. As selector 111 advances off step 21, relay TR operates and transfers the ground connection from brush 6 to brush 5 of the selector 111. The selector 111 advances off step 22 as previously described and advances through steps 1–21 a second time. This time it operates relays GRP 20 to GRP 39 consecutively. When brush 5 contacts terminal 21 for the second time it connects ground to operate the reset relay RST. When relay RST is operated in the above manner or by the end of cycle circuit, it breaks contacts 3 to release the STRT relay, and locks through its contacts 6 and through contacts 6 of the STRT relay to ground.

Relay STRT when released opens the locking path through contacts 3, opens contacts 6 to release the RST relay, and closes the switching circuit reset path through contacts 1. This permits a negative bias to be applied through resistor 67 to the advancing circuit until either brush 1 or brush 2 of selector 111 grounds out the reset potential on step 22. The STRT relay also opens contacts 12 to remove the negative bias from the start path and from the normal advance path of the stepping circuit.

If the reset was initiated by the EC relay, the EC 1 relay remains operated after the test apparatus has reset. When the new test cycle begins, operation of key 94 will release the EC 1 relay through its normally closed contacts. This will bring the test apparatus back to its starting position, and the next test run can begin.

With reference to the position select circuitry 130, of FIGS. 6 and 13, when the test apparatus is to be advanced rapidly to a higher numbered test position or circuit, the position select hundreds, tens and units keys 131 for the desired number are depressed in the above order. Prior to the operation of keys 131 the key 95 is operated in order to break the reset path for selector 111.

The rapid advancement of the switching circuitry is achieved by a sizeable reduction in the value of the RC constant of the driving circuitry. While progressing through the regular driving channel the time constant for the illustrated embodiment is about .58 seconds, but using the position select keys 131 the time constant decreases to about .055 seconds or less than one tenth of the original value. As seen from FIG. 8, this results from omitting the current limiting resistors 132 and 61 and introducing a new resistor 134 which is much smaller in value.

Before operating any of the position select keys 131, key 94 is operated momentarily energizing the STRT relay. The STRT relay breaks the reset path to the driving circuitry through contacts 1. This prevents the reset paths from resetting the selector 111 to position 22 when the selector 111 is in some position other than 22. The STRT relay when energized, will send a pulse through contacts 12 to the driving circuitry 110. If the programmed information of the logic circuitry 100 is in agreement with the result the test apparatus will advance. To disable this path for trouble-shooting purposes, the hold key 95 should be operated. The hold key 95 will break the path to the driving circuitry 110 through its normally closed contacts.

After these preparatory steps the position select keys 131 can be operated starting with the highest order. If any one of the hundreds keys are operated, the test apparatus will advance to the number depressed and stop. The path of operation would be as follows: one side of the key 131 is connected to −48 volt through resistor 134 and an indicator lamp 0–3. (These indicator lamps are located in the position reset keys on the apparatus.) The other side of the key 131 is connected to the interrupter contacts of selector 111. When the key 131 is depressed, negative potential is applied to the base 157 of transistor Q4 and in turn to the base 66 of Q1. The switching circuitry will then advance.

The switching circuitry will advance as long as negative potential is applied to the interrupter contacts of selector 111. When the circuitry has reached the position of the depressed position select key 131 the negative potential will be grounded at the associated digit indicator lamp and the selector 111 will stop.

The visual indication will depend on the position of the W-J lever 125. The lever operates a microswitch and this in turn operates the WJ relays WJ1, etc. The function of the W-J lever 125 will be explained in more detail later on.

If one of the keys in the B row of the position select key block is operated the selector 111 will advance to the number depressed and stop there. The selector 111 is driven through the following electrical path which appears on FIG. 13: −48 volts through resistor 136, through lamp corresponding to the depressed key, through the key 131 itself to the interrupter contacts of selector 111. When the selector 111 reaches the desired position the driving potential will be grounded out at the lamp through brush 3 to ground.

Keys 0–4 and 5–9 in row C of the position select key 131 are effective only if the W-J lever 125 is in position W. In position J they are cut off through contacts 6 of relay WJ-1. When slide 125 is in position W the operation of one of these keys will advance selector 111 one step, and then will be grounded out through resistor 137, the lamp itself, the closed contacts of the U Relay, WJ-1 contacts 11 and either contacts 6 of STRT or contacts 12 of the HV relay operated.

In the position indicate circuit 150, units, tens and hundreds indicating lamps 151, 152 and 153 are connected to indicate the circuit under test. One lamp in each group lights, to provide digital read out under control of the advancing switching circuit 60. The units digit indicates (0–4) of (5–9) because five circuits are tested at each test step. When indication by test steps or individual jack circuit numbers is desired, as on regular switchboard jack strips, the operation of a lever 125 changes the connections and the designation of the lamps. In this mode the units (5–9) and hundreds (0–3) become tens (0–3) and units (0–9) respectively.

The counting circuitry of the test apparatus can be instructed to indicate two different sets of numbers depending on the position of the W-J slider 125. When the W-J slider is in position J the numbering starts with 00 and goes up to 39. When it is in position W the numbering begins with 00 and goes up to 199. The same indicator lamps are used in both cases, but the A row in the first case is read tens, the B row as units, and the C is disconnected. In the second case the A row is hundreds, the B row is tens, the C row is units.

When the W-J slide 125 is in the J position, none of the relays designated WJ will be operated. As the selector 111 advances, the indicator lamps will be grounded sequentially. The ground for the lamps in the A row will be provided through brush 1 of the selector 111 and for the lamps in the B row through brush 3 of selector 111.

On position 1 of selector 111, lamp 0 in the A row is lighted through resistor 134, closed contacts 4 of the TR relay, strapped terminals 1–10 of brush 1 to ground. The 0 lamp in the B row is lighted through resistor 136, the lamp itself, diode 138, contacts 1 of the relay WJ 4, terminal 1 of the selector 111 brush 3, to ground.

On position 2 of selector 111, 0 in the A row remains lighted and 1 in the B row will be lighted through contacts 2 of the WJ 4 relay. On every step of selector 111 a new lamp in the B row will be lighted i.e., up to position 10 of the selector 111.

On position 11 the 1 lamp in the A row will be lighted along with the 0 lamp in the B row. The 1 lamp in the A row remain lighted up to position 20 of selector 1. The indication in the B row will be the same as before, progressing from 0 to 9. At positions 21 and 22 no indication occurs. The TR relay operates as soon as selector 111 steps off position 21 and locks up through contacts 1 of the TRA relay and either contacts 6 of the STRT relay or contacts 12 of the HV relay. On the next cycle lamp 2 lights up in the A row (operating path: −48 volts through resistor 134, the lamp itself, contacts 12 of WJ5, contacts 4 of the TR relay operated to strapped terminals 1–10 of selector 111 brush 1.) The B row will be operating the same way as before, progressing from 0 to 9. On position 21 of selector 111 lamps 3 will light in the A row (operating path: —48 through resistor 134, contacts 6 of relay TR operated contacts 11 of the WJ5 relay to terminals 5 to strapped terminals 11–20 on brush 1). The lamps in the B row will again light progressively from 0 to 9. When the W-J lever is in position W the relays designated WJ will operate. The operation of these relays will change the position indicate system.

The lamps 153 in the A row will indicate hundreds. (With the operation of the WJ relays lamps 2 and 3 of this row are automatically disconnected.) The lamps 152 in the B row indicate tens and the lamps 151 in the C row indicate units. On every other step of selector 111 the U relay will operate. Depending on the condition of the U relay, the unit indicating lamps 151 will either indicate 0–4 or 5–9. When the selector 111 is on position 1 the U relay is operated. Current flows through the windings of U relay, diode 139, contacts 1 of relay WJ4, terminal 1 of selector 111 brush 3 to ground. When the U relay is operated, indicator lamp 0–4 will light. On position 1 of the selector 111, lamp 0 in the A and B row and lamp 0–4 in the C row will be lighted. As the selector 111 advances to position 2, lamp 0 in the A and B row will remain lighted, but the U relay will be released and lamp 5–9 will lights while 0–4 extinguishes. On position 3, 0 will be lighted in the A row, 1 in the B row and 0–4 in the C row. The 0–4 reappears since the U relay will be operated again on step 3. This sequence will follow up to position 20. At this point the indication will be 0 on the A row, 9 on the B row, and 5–9 on the C row. For the next two steps of selector 111, no lamp indication occurs. But after position 21, the TR relay operates and locks up as explained earlier in this section.

On the next cycle of the selector 111, lamp 1 in the A row will be lighted. The operating path is: —48 v. through resistor 134, lamp 1, contacts 12 of operated relay WJ5, 4 of TR operated to brush 1. The indication of the lamps in the B row and in the C row will be the same as on the first cycle of selector 111.

To reset the test apparatus after verifying the last circuit, the number of the last circuit tested is registered by depressing the associated position reset keys 141 (FIG. 9). These keys lock and provide a negative potential through their associated lamps and isolating diodes to bias transistor Q2 to saturation. Q2 may also be forward biased by a negative potential coming from the selector winding, or from either the FGS or BDS relays operated. When the switching circuit advances to a test position which lights the lamps corresponding to all of the depressed position reset keys 141, then the negative potential through these keys is shunted to ground through their associated lamps and transistor Q2 is forward biased only by the negative potential from selector 111 winding. Upon finding that the detector indications agree with the program, the logic circuit 100 permits the selector drive circuit 110 to ground the winding terminal of selector 111, to advance the circuit. This ground shunts out the remaining negative source to the base 154 of Q2 and allows it to cut off. With Q2 cut off, relay EC operates to indicate end of cycle and to trip the RST reset relay.

The position reset keys 141 provide means for automatically resetting the test apparatus if the switching circuit 60 advances up to the number indicated by the depressed keys. The depressed keys provide a negative potential to the base 154 of transistor Q2, on the reset subassembly board. The keys in the A row once operated will connect —48 volts through resistor 134, their associated lamps 0–3, their own make contacts, diode 143 and resistor 144 to the base 154 of transistor Q2. The current drain is so small due to the high value resistors 144 and 146 that the lamp will not light at this point. When one of the keys in the B row is operated, it will also apply a negative potential to the base 154 of Q2. The path includes 75 resistor 136, the associated lamp, diode 147, resistor 144 to the base 154 of Q2. Negative potential through keys in the C row can be applied to the base 154 of Q2 only if the WJ lever is in position W. Q2 also gets a negative bias from the winding of selector 111 through resistor 148.

Upon operation of relays BDS or FGS, a negative potential will also be available at the base 154 of Q2. As long as any of these sources will not be shunted out, transistor Q2 will be forward biased. Q2 forward biased will in effect put a short across the winding of the EC relay.

When the switching circuitry has reached the depressed number in the A row, that number will light to ground potential applied by the selector and the negative potential to the base 154 of Q2 will be shunted to ground. When the switching circuitry 60 has reached the depressed number in the B row that number will light also, removing the biasing potential from Q2. At this point, the negative bias is only available from the windings of selector 111. But as Q1 in the selector drive circuit 110 becomes conductive, it will shunt the negative potential to ground, thereby removing the one remaining biasing potential from the base 154 of Q2. Q2 cuts off and relay EC operates. EC operated, will operate the EC1 relay through contacts 3 and the closed contacts 6 of the STRT relay.

The EC1 relay when operated locks through its own contacts 8 to ground through key 94, energizes the RST relay through contacts 9 and make contacts 6 of relay STRT and provides a path through contacts 12 for lighting either the OK or the REJECT light.

The RST relay (FIG. 7G) when operated breaks the path to the selector drive circuit through contacts 12, breaks the operating potential to the GRP relays through its contacts 10, breaks the locking path to the STRT relay through its contacts 3, and provides a reset path for the selector 111 through its contacts 1.

The RST relay has other contacts which are utilized, but since they perform no part in resetting selector 111, they will be discussed at this point. The STRT relay is released by the operation of the RST relay. Relay STRT falls and in turn RST relay falls.

Selector 111 will reset to position 22 (the operating path is —48 volts through resistor 67 closed contacts 9 of the HV relay, closed contacts 1 of STRT relay, diode 129 to the selector drive 110.) Selector 111 will advance and at position 22 the —48 volts will be shunted out through brush 6, and contacts 5 of the TR relay. If the programmed number of the position reset key 141 was larger than 20, then the —48 volts will be shunted out through brush 5 and contacts 5 of the TR relay operated.

With reference to the TRA and TR relays of FIG. 8, if a number smaller than 20 is programmed on the position reset keys 141, the TR relay will not operate. By the time selector 111 gets to position 21, the STRT relay will have fallen and the TR relay will have no ground potential available. If a number larger than 20 is programmed at position 21, relay TRA will be operated but TR will not. RST will not be operated either since the path to ground is broken by 5B of TR when it is inoperative.

If a breakdown occurred on the last step, relays BDS or FGS would have been operated and the test apparatus would not have reset. If a breakdown occurs during the testing procedure, relays BDS or FGS will be operated but by bystepping the trouble, they will release. As soon as selector 111 leaves position 21, TR will be operated through contacts 1 of TRA and contacts 6 of STRT both operated. TR and TRA will remain energized until the RST operates and test apparatus resets.

Figure 19:
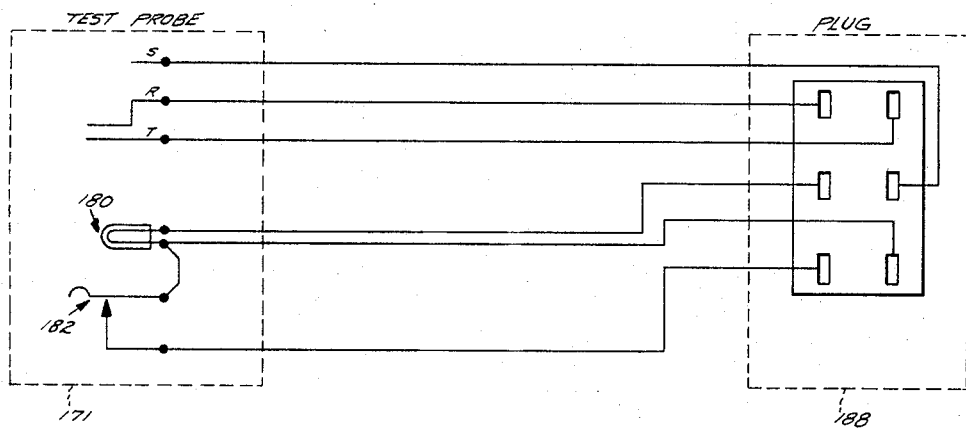
FIG. 19 shows the test probe circuit.

FIG. 19 illustrates the electrical circuit of the test probe 171 which is used for manual operation of the test apparatus. The probe 171, as seen in FIG. 20, comprises a gun-type having a probe end 182, a barrel 186 having a lamp 182 mounted therein and a handle 187. A conventional plug 188 connects the probe to the test apparatus.

FIG. 20 shows the control panel of the apparatus with the various keys and indicators previously described. The advantages of the apparatus may be appreciated by observing the simplicity of the controls for the different test operations.

It is to be understood that the above described arrangements are simply illustrative of the principles of the invention. Numerous other arrangements may be readily devised by those skilled in the art which will embody the principles of the invention and fall within the spirit and scope thereof.

What is claimed is:

1. An apparatus for simultaneously testing a plurality of circuits for continuity and short circuit conditions comprising:
   a power supply,
   a plurality of transformers equal in number to the number of circuits under test, each transformer having a primary winding and a pair of secondary windings, the primary winding of each transformer being connected to the power supply and a first one of said secondary windings being connected in series with the like secondary winding of each transformer,
   a plurality of short circuit detectors, each connected to a first one of said secondary windings,
   a plurality of rectifying circuits,
   a plurality of bridge circuits, each connected to a second one of said secondary windings through a rectifying circuit, and comprising a pair of ratio arm resistors, an arm including a standard resistance, and an arm designed to include the circuit to be tested,
   an individual transformer connected across each bridge circuit,
   an unbalance detector coupled to each individual transformer and actuable by a bridge unbalance signal when the resistance of the circuit under test is equal to or less than the standard resistance,
   means for connecting successive groups of circuits to the bridge circuits for simultaneous testing, and
   means coupled to each unbalance detector and each short circuit detector and responsive to a fault condition in at least one of the circuits under test for indicating the fault and stopping the progression of the test.

2. An apparatus in accordance with claim 1 further including:
   a plurality of conductor flow detectors, each connecting one leg of each bridge circuit to the series connected secondary winding of a corresponding transformer creating a potential difference between any two of the plurality of bridge circuits which will cause a current flow if a circuit between any two bridges is completed by a short in the circuit under test, and
   a resistor between adjacent secondary windings to limit the current flow so that substantially the same current flows in the test circuitry whether the short is between adjacent circuits of a group under test or between that group of circuits and other groups of circuits.

3. An apparatus in accordance with claim 2 further including:
   a current flow detector in series with the last of the plurality of current flow detectors and the last secondary winding and at a potential difference from the last detector, and
   means for connecting the current flow detectors to circuits in succeeding groups to be tested to check for shorts between the circuits under test and the circuits to be tested.

4. Apparatus in accordance with claim 3 further including:
   a high potential breakdown detector for testing each of the circuits under test one at a time.

5. An apparatus in accordance with claim 1 wherein:
   the means coupled to the unbalance detectors and short circuit detectors includes a logic circuit.

6. An apparatus in accordance with claim 1 wherein:
   each unbalance detector is coupled to a trigger circuit.

7. An apparatus for testing electrical circuits comprising:
   a power supply,
   a plurality of transformers equal in number to the number of circuits under test, each transformer having a primary winding and a pair of secondary windings, the primary winding of each transformer being connected to the power supply and a first one of said secondary windings being connected in series with the like secondary winding of each transformer,
   a plurality of rectifying circuits,
   a plurality of bridge circuits, each connected to a second one of said secondary windings through a rectifying circuit, and comprising a pair of ratio arm resistors, an arm including a standard resistance, and an arm designed to include the circuit to be tested,
   an unbalance detector coupled to each individual transformer and actuable by a bridge unbalance signal when the resistance of the circuit under test is equal to or less than the standard resistance,
   a switching circuit coupled to the circuits to be tested for selecting circuits for testing,
   a first switching circuit drive normally operable upon completion of a continuity and short test to partially complete a circuit path to operate the switching circuit,
   means responsive to a continuity or short fault condition to prevent the drive from advancing, and
   a second switching circuit drive coupled to the first drive, said second drive being operable upon successful completion of a high potential breakdown test on separate circuits to advance the drive to the next circuit and on completion of the high potential test to actuate the switching circuit to select another group of circuit.

8. An apparatus in accordance with claim 7 further including:
   a predetermined group of continuity detectors, and
   a logic circuit connected to and monitoring the output of the continuity detectors.

9. An apparatus in accordance with claim 7 further including:
   a sensing circuit, and
   a relay actuated by the sensing circuit when the unbalance signal is under a predetermined magnitude.

References Cited

UNITED STATES PATENTS

| | | | |
|---|---|---|---|
| 2,762,014 | 9/1956 | Anderson | 324—73 |
| 2,849,677 | 8/1958 | Hannon | 324—73 |
| 2,970,230 | 1/1961 | Adams | 307—112 |
| 2,977,535 | 3/1961 | O'Connor | 324—73 |
| 3,045,184 | 7/1962 | Stetzler | 324—158 |
| 3,182,253 | 5/1965 | Dorsch | 324—73 XR |
| 3,218,546 | 11/1965 | James | 307—112 XR |

RUDOLPH V. ROLINEC, *Primary Examiner.*

WALTER L. CARLSON, *Examiner.*

E. L. STOLARUN, *Assistant Examiner.*